US012811313B2

(12) United States Patent
Babakhani et al.

(10) Patent No.: US 12,811,313 B2
(45) Date of Patent: Nov. 24, 2026

(54) HIGHLY POWER EFFICIENT P-I-N DIODE-BASED THz RADIATING ARRAY

(71) Applicant: The Regents of the University of California, Oakland, CA (US)

(72) Inventors: Aydin Babakhani, Los Angeles, CA (US); Seyedmohammadreza Razavian, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 214 days.

(21) Appl. No.: 18/717,963

(22) PCT Filed: Dec. 8, 2022

(86) PCT No.: PCT/US2022/081201
§ 371 (c)(1),
(2) Date: Jun. 7, 2024

(87) PCT Pub. No.: WO2023/108085
PCT Pub. Date: Jun. 15, 2023

(65) Prior Publication Data

US 2025/0055202 A1 Feb. 13, 2025

Related U.S. Application Data

(60) Provisional application No. 63/265,130, filed on Dec. 8, 2021.

(51) Int. Cl.
*H01Q 21/06* (2006.01)
*H01Q 3/26* (2006.01)
(Continued)

(52) U.S. Cl.
CPC ............. *H01Q 21/062* (2013.01); *H01Q 3/26* (2013.01); *H01Q 9/26* (2013.01); *H01Q 23/00* (2013.01); *H02J 50/27* (2016.02)

(58) Field of Classification Search
CPC .......... H01Q 21/062; H01Q 3/26; H01Q 9/26; H01Q 23/00; H02J 50/27
See application file for complete search history.

(56) References Cited

U.S. PATENT DOCUMENTS

| | | | |
|---|---|---|---|
| 4,675,872 | A | 6/1987 | Popek et al. |
| 4,837,735 | A | 6/1989 | Allen, Jr. et al. |

(Continued)

FOREIGN PATENT DOCUMENTS

| | | | |
|---|---|---|---|
| EP | 3991247 | A1 | 5/2022 |
| EP | 3991247 | B1 | 9/2025 |

(Continued)

OTHER PUBLICATIONS

Extended European Search Report for European Application No. 20831237.1, Search completed May 3, 2023, Mailed May 15, 2023, 13 Pgs.

(Continued)

*Primary Examiner* — Seokjin Kim
(74) *Attorney, Agent, or Firm* — KPPB LLP

(57) ABSTRACT

Systems and methods for fabricating a highly power efficient p-i-n diode-based THz radiating array in accordance with embodiments of the invention are illustrated. One embodiment includes a p-i-n diode-based intercoupled THz radiating array, including: a plurality of radiating array elements, wherein each array element comprises an oscillator core oscillating at a fundamental frequency, and where the oscillator core of each array element is locked to an adjacent oscillator core through a coupling network comprising T-lines; and a p-i-n diode coupled to the oscillator core of each array element and configured to produce harmonics of the fundamental frequency from a signal from the oscillator core.

19 Claims, 20 Drawing Sheets

(51) Int. Cl.

| | |
|---|---|
| ***H01Q 9/26*** | (2006.01) |
| ***H01Q 23/00*** | (2006.01) |
| ***H02J 50/27*** | (2016.01) |

(56) References Cited

U.S. PATENT DOCUMENTS

| | | | | |
|---|---|---|---|---|
| 5,508,661 | A | 4/1996 | Keane et al. | |
| 9,438,249 | B1 | 9/2016 | Nguyen et al. | |
| 9,948,291 | B1 | 4/2018 | Weigand et al. | |
| 10,211,528 | B2 | 2/2019 | Assefzadeh et al. | |
| 10,222,468 | B2 | 3/2019 | Assefzadeh et al. | |
| 10,564,248 | B1 | 2/2020 | Simons et al. | |
| 11,442,159 | B2 | 9/2022 | Babakhani et al. | |
| 12,123,938 | B2 | 10/2024 | Babakhani et al. | |
| 12,250,014 | B2 | 3/2025 | Babakhani et al. | |
| 2002/0130331 | A1 | 9/2002 | Nemoto | |
| 2004/0018018 | A1 | 1/2004 | Izadpanah | |
| 2004/0166817 | A1 | 8/2004 | Mokhtari et al. | |
| 2006/0039449 | A1 | 2/2006 | Fontana et al. | |
| 2006/0076493 | A1 | 4/2006 | Bluzer | |
| 2007/0120677 | A1 | 5/2007 | Park et al. | |
| 2007/0298712 | A1* | 12/2007 | Boguslavskij | H03F 1/52 455/217 |
| 2008/0067632 | A1 | 3/2008 | Silver et al. | |
| 2010/0033709 | A1 | 2/2010 | Lampin et al. | |
| 2010/0036369 | A1* | 2/2010 | Hancock | A61B 18/1815 606/33 |
| 2010/0084570 | A1* | 4/2010 | Katagiri | H01Q 13/085 250/458.1 |
| 2010/0213375 | A1 | 8/2010 | Loeffler et al. | |
| 2012/0212383 | A1* | 8/2012 | Sengupta | H01Q 1/2283 343/742 |
| 2012/0299770 | A1 | 11/2012 | Lee | |
| 2014/0091376 | A1* | 4/2014 | Boppel | H10F 30/21 257/291 |
| 2014/0191351 | A1 | 7/2014 | Sertel et al. | |
| 2015/0263424 | A1 | 9/2015 | Sanford et al. | |
| 2015/0288393 | A1* | 10/2015 | Han | H04B 7/0602 375/295 |
| 2016/0097718 | A1 | 4/2016 | Tekin et al. | |
| 2016/0149441 | A1 | 5/2016 | Nayak | |
| 2016/0338798 | A1 | 11/2016 | Vora et al. | |
| 2016/0344108 | A1* | 11/2016 | Assefzadeh | H01Q 3/2682 |
| 2018/0019755 | A1 | 1/2018 | Josefsberg et al. | |
| 2018/0041166 | A1* | 2/2018 | Han | H03B 5/1847 |
| 2018/0052186 | A1 | 2/2018 | Su et al. | |
| 2018/0348431 | A1 | 12/2018 | Bassett et al. | |
| 2018/0373905 | A1 | 12/2018 | Gravelle et al. | |
| 2019/0280389 | A1 | 9/2019 | Song et al. | |
| 2021/0018610 | A1 | 1/2021 | Babakhani et al. | |
| 2022/0247437 | A1 | 8/2022 | Babakhani et al. | |
| 2023/0081567 | A1 | 3/2023 | Babakhani et al. | |

FOREIGN PATENT DOCUMENTS

| | | | |
|---|---|---|---|
| WO | 2020264279 | A1 | 12/2020 |
| WO | 2023108085 | A1 | 6/2023 |

OTHER PUBLICATIONS

International Preliminary Report on Patentability for International Application PCT/US2020/039800, Report issued Dec. 28, 2021, Mailed on Jan. 6, 2022, 6 Pgs.

International Preliminary Report on Patentability for International Application PCT/US2022/081201, Report issued Jun. 5, 2024, Mailed on Jun. 20, 2024, 8 Pgs.

International Search Report and Written Opinion for International Application No. PCT/US2022/081201, Search completed Feb. 14, 2023, Mailed Mar. 15, 2023, 13 Pgs.

International Search Report and Written Opinion for International Application No. PCT/US2020/039800, Search completed Aug. 22, 2020, Mailed Sep. 11, 2020, 13 Pgs.

Aggrawal et al., "Gone in a Picosecond: Techniques for the Generation and Detection of Picosecond Pulses and their Applications", Ieee Microwave Magazine, Ieeeservice Center, Piscataway, NJ, US, Dec. 1, 2016, vol. 17, No. 12, pp. 24-38, XP011634104, ISSN: 1527-3342, DOI: 10.1109/MMM.2016.2608764 [retrieved on Nov. 10, 2016].

Andersen et al., "A 118-mW Pulse-Based Radar SoC in 55-nm CMOS for Non-Contact Human Vital Signs Detection", IEEE Journal of Solid-State Circuits, vol. 52, No. 12, Dec. 2017, pp. 3421-3433, doi: 10.1109/JSSC.2017.2764051.

Arbabian et al., "A 94 GHz mm-Wave-to-Baseband Pulsed-Radar Transceiver with Applications in Imaging and Gesture Recognition", IEEE Journal of Solid-State Circuits, vol. 48, No. 4, Apr. 2013, pp. 1055-1071, DOI: 10.1109/JSSC.2013.2239004.

Assefzadeh et al., "Broadband Oscillator-Free THz Pulse Generation and Radiation Based on Direct Digital-to-Impulse Architecture", IEEE Journal of Solid-State Circuits, vol. 52, No. 11, Nov. 2017, Date of Publication: Aug. 30, 2017, pp. 2905-2919, DOI: 10.1109/JSSC.2017.2739180.

Besnoff et al., "Battery-free multichannel digital ECG biotelemetry using UHF RFID techniques", 2013 IEEE International Conference on RFID, 2013, pp. 16-22.

Bourdel et al., "A 9-pJ/pulse 1.42-Vpp OOK CMOS UWB pulse generator for the 3.1-10.6-GHz FCC band", IEEE Transactions on Microwave Theory and Techniques, vol. 58, No. 1, 2009, pp. 65-73.

Chae et al., "A 128-channel 6 mW wireless neural recording IC with spike feature extraction and UWB transmitter", IEEE Transactions on Neural Systems and Rehabilitation Engineering, vol. 17, No. 4, 2009, pp. 312-321.

Chen et al., "A Nonlinear Q-Switching Impedance Technique for Picosecond Pulse Radiation in Silicon", IEEE Transactions on Microwave Theory and Techniques, vol. 64, No. 12, Dec. 2016, pp. 4685-4700, DOI: 10.1109/TMTT.2016.2623700.

Cruz et al., "Hybrid UHF/UWB antenna for passive indoor identification and localization systems", IEEE Transactions on Antennas and Propagation, vol. 61, No. 1, pp. 354-361, 2013.

Dickson, "On-chip high-voltage generation in MNOS integrated circuits using an improved voltage multiplier technique", IEEE Journal of Solid-State Circuits, vol. 11, No. 3, 1976, pp. 374-378, doi: 10.1109/JSSC.1976.1050739.

Han et al., "A 260GHz broadband source with 1.1mW continuous-wave radiated power and EIRP of 15.7dBm in 65nm CMOS", IEEE International Conference on Solid-State Circuits (ISSCC), Feb. 17-21, 2013, San Francisco, CA, USA, pp. 138-139, DOI: 10.1109/ISSCC.2013.6487671.

Kang et al., "Design and Optimization of Area-Constrained Wirelessly Powered CMOS UWB SoC for localization applications", IEEE Transactions on Microwave Theory and Techniques, vol. 64, No. 4, Apr. 2016, pp. 1042-1054, doi: 10.1109/TMTT.2016.2536663.

Koski et al., "Fundamental Characteristics of Electro-Textiles in Wearable UHF RFID Patch Antennas for Body-Centric Sensing Systems", IEEE Transactions on Antennas and Propagation, vol. 62, No. 12, Dec. 2014, Date of Publication: Oct. 20, 2014, pp. 6454-6462.

Le et al., "Efficient Far-Field Radio Frequency Energy Harvesting for Passively Powered Sensor Networks", IEEE Journal of Solid-State Circuits, vol. 43, No. 5, May 2008, pp. 1287-1302, doi: 10.1109/JSSC.2008.920318.

Lin et al., "A 128.24-to-137.00GHz injection-locked frequency divider in 65nm CMOS", 2009 IEEE International Solid-State Circuits Conference, Digest of Technical Papers, 2009, pp. 282-283.

Lin et al., "Analysis and Design of D-Band Injection-Locked Frequency Dividers", IEEE Journal of Solid-State Circuits, vol. 46, No. 6, pp. 1250-1264, 2011.

Lu et al., "Performance evaluation of a long-range RFID tag powered by a vibration energy harvester", IEEE Antennas and Wireless Propagation Letters, vol. 16, 2017, pp. 1832-1835.

Lyu et al., "A 100-M/s 2.6-pJ/pulse compact UWB impulse transmitter based on antenna-and-pulsegenerator codesign", IEICE Electronics Express, vol. 16, No. 24, 2019, 20190672-20190672, 4 pgs.

Lyu et al., "A 430-Mhz Wirelessly Powered Implantable Pulse Generator With Intensity/Rate Control and Sub-1 µA Quiescent

(56) References Cited

OTHER PUBLICATIONS

Current Consumption", IEEE Transactions on Biomedical Circuits and Systems, vol. 13, No. 1, Feb. 2019, pp. 180-190, DOI: 10.1109/TBCAS.2018.2879357.
Lyu et al., "A 915-MHz Far-Field Energy Harvester With—22-dBm Sensitivity and 3-V Output Voltage Based on Antenna-and-Rectifier Codesign", IEEE Microwave and Wireless Components Letters, vol. 29, No. 8, 2019, pp. 557-559.
Lyu et al., "An Energy-Efficient Wirelessly Powered Millimeter-Scale Neurostimulator Implant Based on Systematic Codesign of an Inductive Loop Antenna and a Custom Rectifier", IEEE Transactions on Biomedical Circuits and Systems, vol. 12, No. 5, Oct. 2018, pp. 1131-1143, DOI: 10.1109/TBCAS.2018.2852680.
Marrocco et al., "The art of UHF RFID antenna design: Impedancematching and size-reduction techniques", IEEE Antennas and Propagation Magazine, vol. 50, No. 1, 2008, pp. 66-79.
Nikitin et al., "Power reflection coefficient analysis for complex impedances in RFID tag design", IEEE Transactions on Microwave Theory and Techniques, vol. 53, No. 9, 2005, pp. 2721-2725.
Occhiuzzi et al., "Modeling, design and experimentation of wearable RFID sensor tag", IEEE Transactions on Antennas and Propagation, vol. 58, No. 8, 2010, pp. 2490-2498.
Öjefors et al., "Active 220- and 325-GHz Frequency Multiplier Chains in an SiGe HBT Technology", IEEE Transactions on Microwave Theory and Techniques, vol. 59, Issue 5, May 2011, pp. 1311-1318, DOI: 10.1109/TMTT.2011.2114364.
Razavi, "A Millimeter-Wave Circuit Technique", IEEE Journal of Solid State Circuits, vol. 43, No. 9, pp. 2090-2098, 2008.
Razavian et al., "A Highly Power Efficient 2x3 PIN-Diode-Based Intercoupled THz Radiating Array at 425GHz with 18.1dBm EIRP in 90nm SiGe BiCMOS", 2022 IEEE International Solid-State Circuits Conference, Conference Date: Feb. 20-26, 2022, San Francisco, California, 3 pgs.
Razavian et al., "Silicon Integrated THz Comb Radiator and Receiver for Broadband Sensing and Imaging Applications", IEEE Transactions on Microwave Theory and Techniques, Aug. 2021.
Riaz et al., "A novel design of UHF RFID passive tag antenna targeting smart cards limited area", 2018 IEEE International Conference on Consumer Electronics (ICCE), 2018, 4 pgs.
Ryan et al., "The Carrier-Storage Frequency Divider: A Steady-State Analysis", IEEE Transactions on Circuit Theory, vol. 11, No. 3, pp. 396-403, Sep. 1964, doi: 10.1109/TCT.1964.1082318.
Saeidi et al., "29.9 A 4×4 Distributed Multi-Layer Oscillator Network for Harmonic Injection and THz Beamforming with 14dBm EIRP at 416GHz in a Lensless 65nm CMOS IC", 2020 IEEE International Solid-State Circuits Conference, Aug. 2020, pp. 456-458.
Schleicher et al., "IR-UWB radar demonstrator for ultra-fine movement detection and vital-sign monitoring", IEEE transactions on microwave theory and techniques, vol. 61, No. 5, 2013, pp. 2076-2085.
Schunemann et al., "A charge-control model of the pin diode", IEEE Transactions on Electron Devices, vol. 23, No. 10, Oct. 1976, pp. 1150-1158, DOI: 10.1109/T-ED.1976.18561.
Stoopman et al., "Co-Design of a CMOS Rectifier and Small Loop Antenna for Highly Sensitive RF Energy Harvesters", IEEE Journal of Solid-State Circuits, vol. 49, No. 3, Mar. 2014, pp. 622-634, doi: 10.1109/JSSC.2014.2302793.
Tan et al., "A 1.2-V 8.3-nJ CMOS humidity sensor for RFID applications", IEEE Journal of Solid-State Circuits, vol. 48, No. 10, 2013, pp. 2469-2477.
Thomas et al., "A 0.4-4 THz p-i-n Diode Frequency Multiplier in 90-nm SiGe BiCMOS", IEEE Journal of Solid-State Circuits, vol. 58, No. 9, pp. 2407-2420, Sep. 2023, doi:10.1109/JSSC.2023.3289129.
Vaz et al., "Full passive UHF tag with a temperature sensor suitable for human body temperature monitoring", IEEE Transactions on Circuits and Systems II: Express Briefs, vol. 57, No. 2, 2010, pp. 95-99.
Vogelsang et al., "A Static Frequency Divider up to 163 GHz in SiGe-BiCMOS Technology", 2022 IEEE BiCMOS and Compound Semiconductor Integrated Circuits and Technology Symposium (BCICTS), Oct. 16-19, 2022, pp. 49-52.
Wang et al., "Single-antenna Doppler radars using self and mutual injection locking for vital sign detection with random body movement cancellation", IEEE Transactions on Microwave Theory and Techniques, vol. 59, No. 12, pp. 3577-3587, 2011.
Wu et al., "Dynamic waveform shaping for reconfigurable radiated periodic signal generation with picosecond time-widths", Custom Integrated Circuits Conference (CICC), Sep. 28-30, 2015, San Jose, CA, USA, pp. 1-4, DOI: 10.1109/CICC.2015.7338411.
Yang et al., "Wearable RFID-enabled sensor nodes for biomedical applications", 58th Electronic Components and Technology Conference, 2008, pp. 2156-2159.
Yeager et al., "A 9 µA, Addressable Gen2 Sensor Tag for Biosignal Acquisition", IEEE Journal of Solid-State Circuits, vol. 45, No. 10, pp. 2198-2209, 2010.

* cited by examiner

| | This Work | ISSCC 2020 H.Saeedi[6] | ISSCC 2020 G.Guimaraes[7] | JSSC 2020 H.Jalili[8] | JSSC 2019 H.Jalili[9] | JSSC 2015 Y.Tousi[10] |
|---|---|---|---|---|---|---|
| Frequency (GHz) | 425 | 416 | 668 | 459 | 344 | 338 |
| EIRP (dBm) | 18.1 | 14 | 7.4 | 19.3 | 4.9 | 17.1 |
| Radiated Power (mW) | 0.31 | 0.5 | 0.025 | 0.66 | 0.21 | 0.79 |
| Tuning Range (%) | 14.6 | 1.7 | 2.3 | 8.9 | 15.1 | 2.1 |
| Source Type | 2×3 PIN diode-based Array | 4×4 Array | 4×2 Array | 25-element Array | 2×2 Array | 4×4 Array |
| Phase Noise (dBc/Hz) @ 10 MHz | -104 | - | -93 | -100.6 | -93.1 | -93@1MHz |
| Die Size (mm × mm) | 0.98 | 4.1 | 0.87 | 3.94 | 1.2 | 7.2 |
| DC-to-THz Efficiency (%) | 0.08 | 0.03 | 0.02 | 0.04 | 0.04 | 0.05 |
| Technology | 90-nm SiGe BiCMOS | 65-nm CMOS | 40-nm CMOS | 65-nm CMOS | 130-nm SiGe BiCMOS | 65-nm CMOS |
| DC Power (mW) | 400 | 1450 | 99.7 | 1470 | 450 | 1540 |

FIG. 8

HIGHLY POWER EFFICIENT P-I-N DIODE-BASED THz RADIATING ARRAY

CROSS-REFERENCE TO RELATED APPLICATIONS

The current application is a national stage application of PCT Application No. PCT/US2022/081201 entitled "A Highly Power Efficient p-i-n Diode-Based THz Radiating Array" filed Dec. 8, 2022, which claims the benefit of and priority to U.S. Provisional Patent Application No. 63/265,130 entitled "Methods and Apparatus for Intercoupled THz Radiating Arrays" filed Dec. 8, 2021, the disclosures of which are hereby incorporated by reference in their entireties for all purposes.

STATEMENT OF FEDERAL SUPPORT

This invention was made with government support under Grant Number 1830123, awarded by the National Science Foundation. The government has certain rights in the invention.

FIELD OF THE INVENTION

The present invention generally relates to integrated circuits and, more specifically, power efficient THz radiating array based on intercoupled oscillator cores for radiating harmonics of fundamental frequencies.

BACKGROUND

Terahertz (THz) radiation refers to the portion of the electromagnetic spectrum between microwaves and infrared light. THz radiation exhibits a high degree of sensitivity, and can be utilized in a wide variety of applications including sensing and medical imaging.

Radiating arrays is a set of multiple connected antennas that work collectively as a single antenna that transmit EM waves. In transmission, the EM waves radiated by each individual antenna can combine and superpose, which can increase power transmitted in desired directions, and reduce power in other directions.

SUMMARY OF THE INVENTION

Systems and methods for fabricating a highly power efficient p-i-n diode-based THz radiating array in accordance with embodiments of the invention are illustrated. One embodiment includes a p-i-n diode-based intercoupled THz radiating array, including: a plurality of radiating array elements, wherein each array element comprises an oscillator core oscillating at a fundamental frequency, and where the oscillator core of each array element is locked to an adjacent oscillator core through a coupling network comprising T-lines; and a p-i-n diode coupled to the oscillator core of each array element and configured to produce harmonics of the fundamental frequency from a signal from the oscillator core.

In another embodiment, the THz radiating array further includes an antenna coupled to the p-i-n diode and radiating at least one harmonic of the fundamental frequency.

In a further embodiment, the antenna is tuned to maximize power radiated at a certain harmonic of the fundamental frequency.

In still another embodiment, the oscillator core comprises a pair of oscillators.

In a still further embodiment, the oscillator is a Colpitts oscillator that provides differential oscillation.

In yet another embodiment, the THz radiating array further includes a cascode transistor that drives the p-i-n diode with the output of the oscillator, where the cascode transistor provides isolation between the p-i-n diode and the oscillator core.

In a yet further embodiment, a biasing current of an oscillator is set by adjusting $V_{be}$ that determines an oscillation frequency through changing transistor base-emitter capacitance, where the THz radiating array further comprises an emitter comprising a resistor in conjunction with a quarter-length T-line.

In another additional embodiment, the antenna includes a folded dipole antenna.

In a further additional embodiment, the antenna includes an on-chip antenna.

In another embodiment again, a T-line network connects the oscillators to each other forming a loop antenna at the fundamental frequency enabling synchronization by an external source.

One embodiment includes a method for wirelessly transmitting harmonics of a target frequency using a THz radiating array, where the method includes: providing a radiating array with an input waveform, the radiating array including a plurality of radiating array elements, wherein each array element comprises an oscillator core oscillating at a fundamental frequency, where the oscillator core of each array element is locked to an adjacent oscillator core through a coupling network comprising T-lines, and a p-i-n diode coupled to the oscillator core and configured to produce harmonics of the fundamental frequency from a signal from the oscillator core. The method further includes tuning the input waveform to the fundamental frequency of the oscillator cores, coupling the plurality of oscillator cores by matching the phases of the oscillator cores, and generating an output waveform at a harmonic of the input waveform using the p-i-n diodes.

In still yet another embodiment, the method further includes radiating the output waveform using an antenna.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 8 illustrates a comparison between silicon-based THz sources.

DETAILED DESCRIPTION

Efficient THz generation in silicon technologies has been of great interest in recent years, as it provides for an integrated low-cost solution for a variety of applications including remote sensing, high-resolution radar, high-speed communication, and spectroscopy. However, direct THz generation using a fundamental oscillator has not been readily available due to current transistors having limited unity current gain (fr or $f_{max}$).

Various approaches to achieving direct THz generation have been developed based on the harmonic extraction and frequency multiplication of a fundamental oscillator, where the nonlinearity of transistors is utilized to generate higher harmonics from a fundamental oscillator or frequency-multiplier cells. However, these methods suffer from poor efficiency and low radiated power due to device limitations. While coherent array schemes capable of increasing effective isotropic radiated power (EIRP) have been used more to compensate for the low generated power, problems with phase adjustments and the locking of frequencies of array elements, which are important factors in array architectures, still persist. Adjusting the phase and locking the frequency of elements can be important in array architectures, which can be performed through Local oscillator (LO) distribution and mutual coupling. LO distribution can cause phase mismatch between elements and significantly increases the direct current (DC) power consumption. Mutual coupling through injection locking can maintain phase alignment. However, this type of coupling has low tuning range, which can make it challenging to synchronize elements.

Systems and methods described herein attempt to remedy these problems by generating THz continuous waves (CW) that utilizes p-i-n diodes in reverse recovery mode instead of the nonlinearity of transistors for strong harmonic generation. A p-i-n diode, similar to a step recovery diode (SRD), benefits from a sharp reverse recovery and is highly nonlinear in the recovery mode, which enables efficient THz harmonic generation by upconverting the output of a mm-wave oscillator without requiring additional blocks and multipliers. In numerous embodiments, the p-i-n diode-based array consists of 2×3 elements, where differential Colpitts oscillators are used to push the p-i-n diodes into reverse recovery. In several embodiments, array elements are intercoupled using a collective coupling approach that enables wide tuning range and phase match between elements. The p-i-n diode-based array can achieve a radiated power of 0.31 mW and 18.1 dBm EIRP at 425 GHz.

Collective Intercoupled Array

Figure 1A:
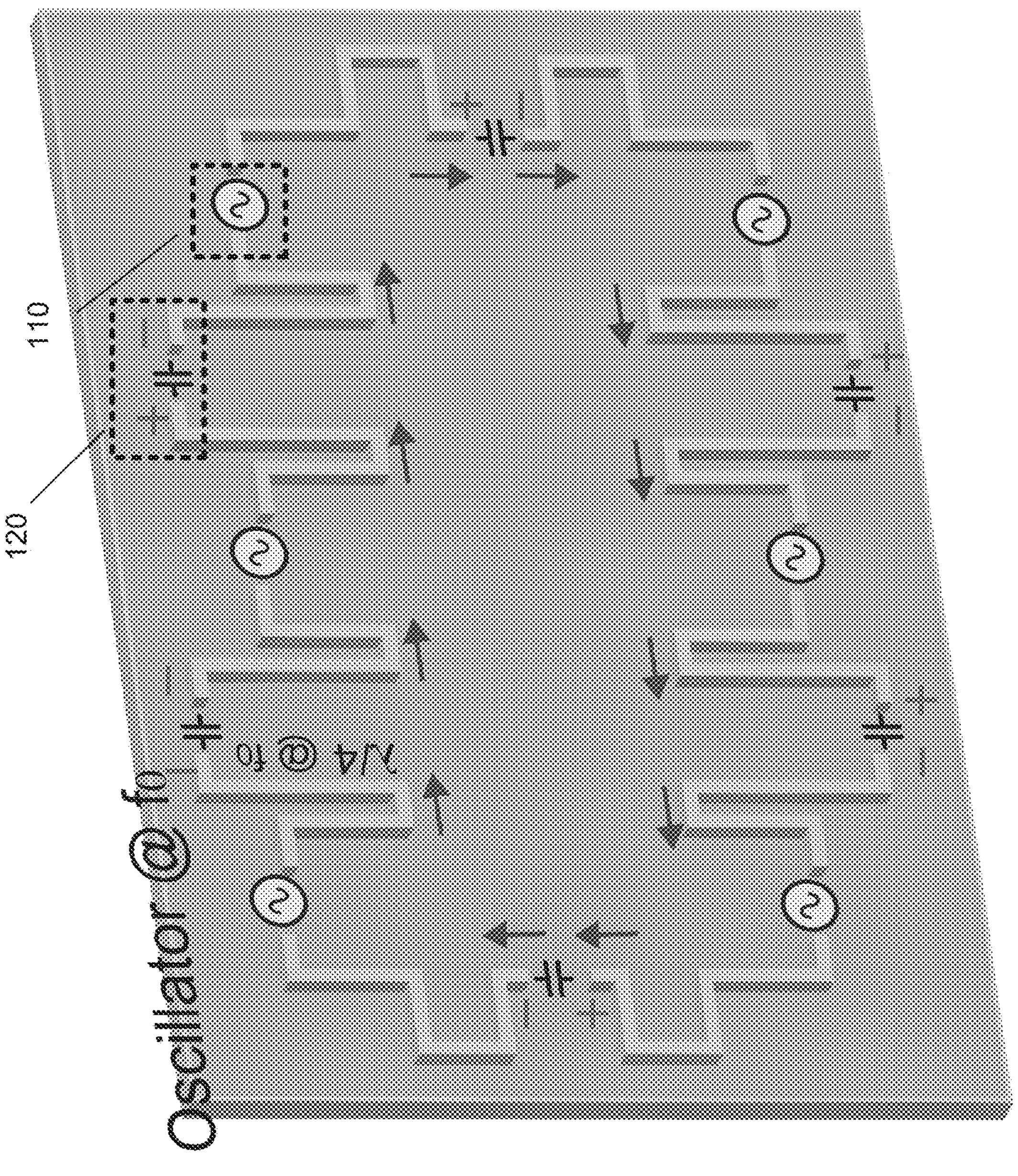
FIG. 1A illustrates a circuit overview of a collective intercoupled array in accordance with embodiments of the invention.
Figure 1B:
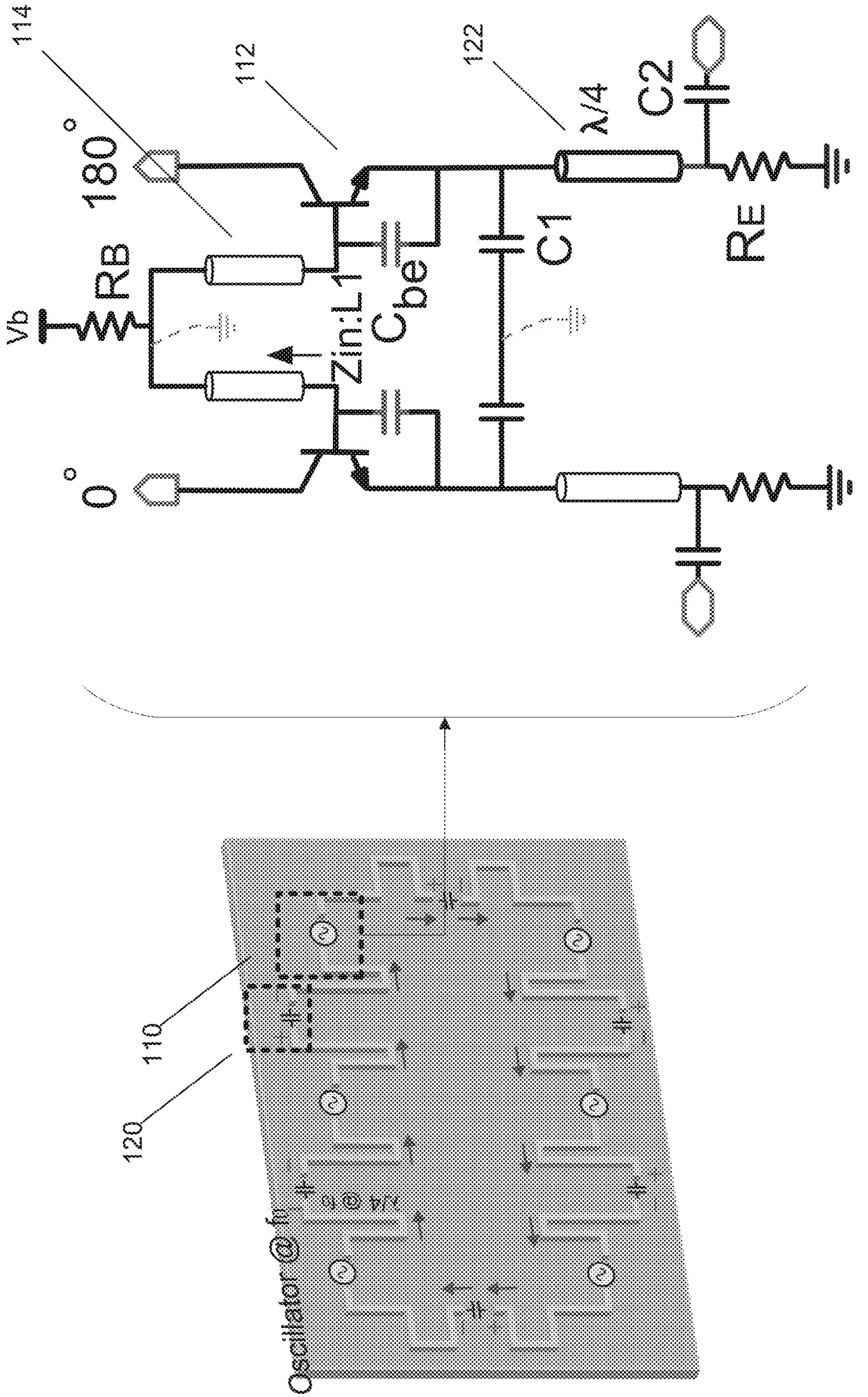
FIG. 1B illustrates an exploded view of an oscillator core in accordance with embodiments of the invention.

A circuit architecture of a collective intercoupled array in accordance with embodiments of the invention is illustrated in FIG. 1A. In many embodiments, the intercoupled array includes oscillator cores 110 that are locked to each other through a coupling network 120. In some embodiments, the intercoupled array may include six oscillator cores 110 that are mutually coupled and placed in a 2×3 arrangement working in a collective fashion, where the oscillator cores are synchronized with one another. An exploded view of an oscillator core 110 in accordance with embodiments of the invention is illustrated in FIG. 1B. Each oscillator core may include a pair of Colpitts oscillators. A Colpitts oscillator may include an NPN transistor 112 connected to a base voltage source $V_b$. A resistor $R_B$ in conjunction with a T-line 114 are connected between $V_b$ and the base of the transistor 112. A capacitor $C_{be}$ is connected between the base and the emitter of the transistor. Colpitts oscillators have two modes of operation: even (common), and odd (differential) modes. In some embodiments, the oscillators within an oscillator core are single differential Colpitts oscillators that are highly optimized with differential oscillation at a fundamental frequency ranging from 80 to 92 GHz. Oscillators operating on differential mode oscillations are less affected by wire bonding interference, and differential Colpitts oscillators generally provide better performance at high frequency with lower phase noise. The biasing current of the oscillators may be set by adjusting $V_b$, which determines the oscillation frequency through changing the transistor base-emitter capacitance. In numerous embodiments, a resistor $R_E$ in conjunction with a quarter-length T-line 122 is connected to the emitter of the transistor. $R_B$ and $R_E$ suppress the oscillation by decreasing the Q-factor of the oscillator core in even mode, meaning that the oscillator core will oscillate for less cycles before stopping, while allowing the differential mode of oscillation between two adjacent oscillator cores. Hence, oscillation may be difficult to persist in even mode. In differential mode, the quarter-length T-line 122 transforms and changes the impedance on the other side of the T-line. By using a resistor instead of an active current source at the emitter of the transistor, a lower phase noise and a higher swing at the emitter of the transistors may be achieved.

Figure 1C:
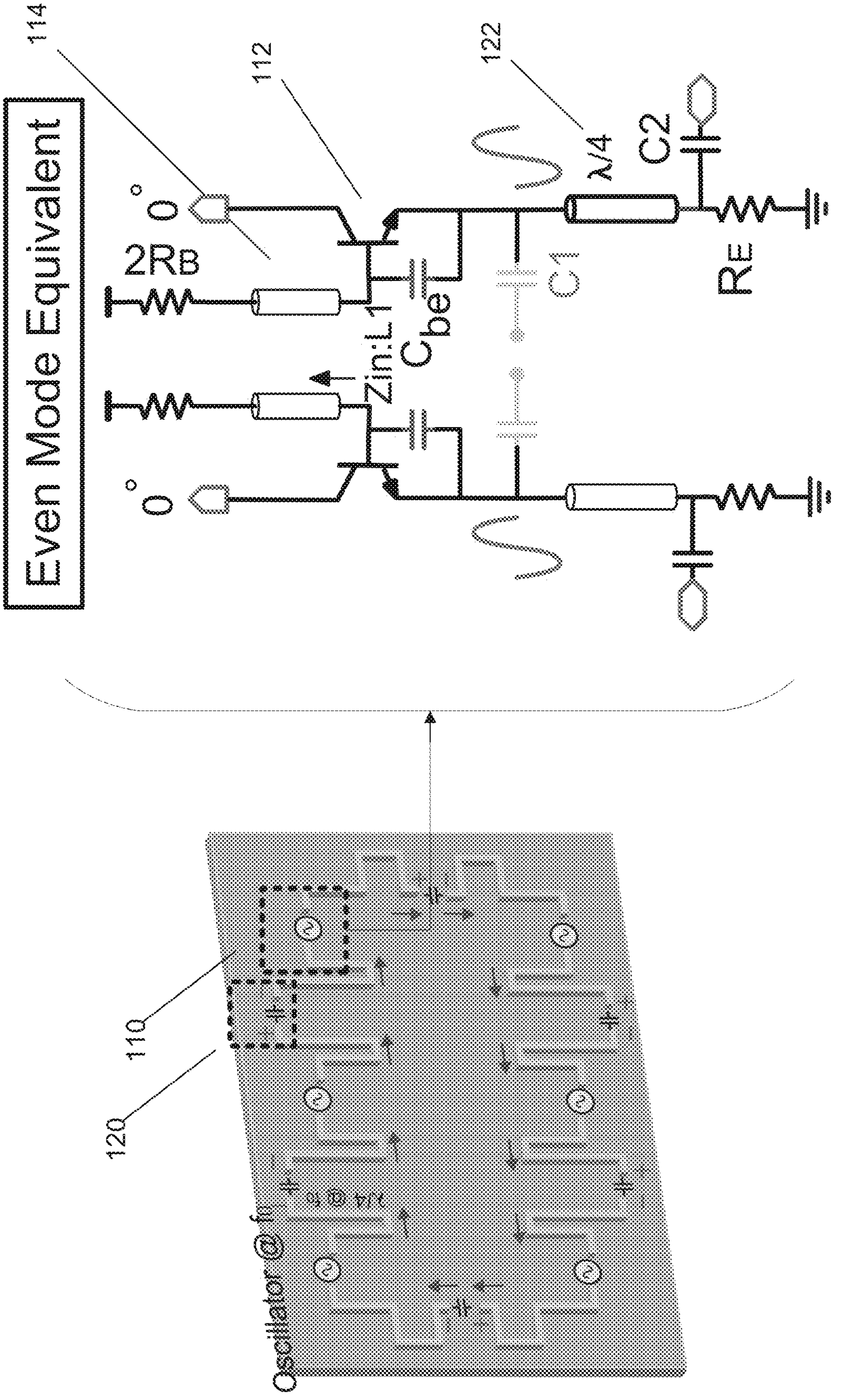
FIG. 1C illustrates an exploded view of the even mode operation of the oscillator core in accordance with embodiments of the invention.
Figure 1D:
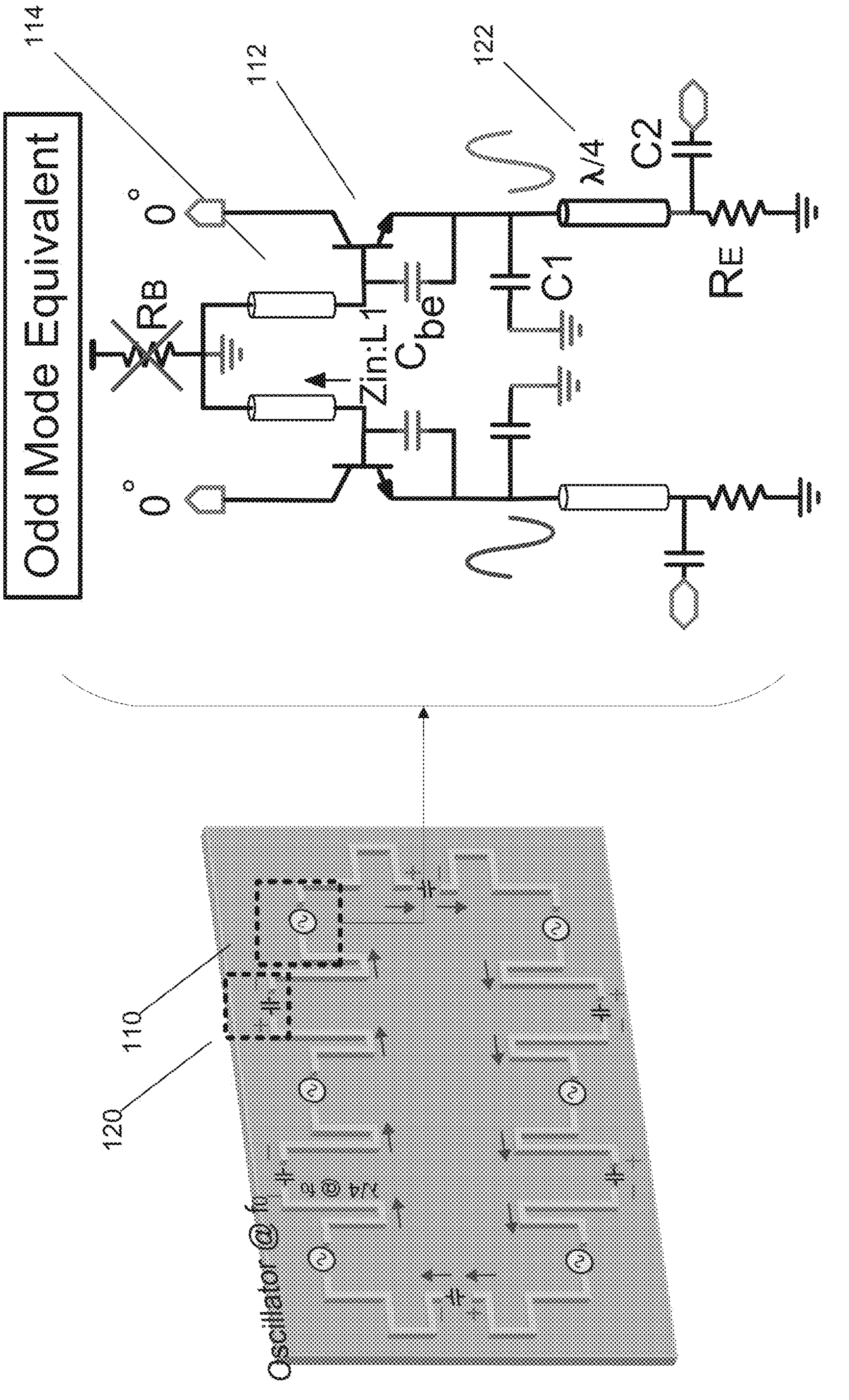
FIG. 1D illustrates an exploded view of the odd mode of operation of the oscillator core in accordance with an embodiment of the invention.

Even mode operation of the oscillator core is illustrated in FIG. 1C in accordance with an embodiment of the invention. In even mode, the medial point is open. Impedance of even mode is approximately half of the odd mode impedance, and therefore is not optimized to maximize signal amplitude of common mode oscillation. Oscillation cannot be sustained due to resistances in the base $R_B$. Odd or differential mode of operation of the oscillator core is illustrated in FIG. 1D in accordance with an embodiment of the invention. In many embodiments, the effect of $R_B$ is not present due to the virtual ground in differential mode, and capacitor C1 is able to produce a strong fundamental frequency at 90 GHz.

Figure 1E:
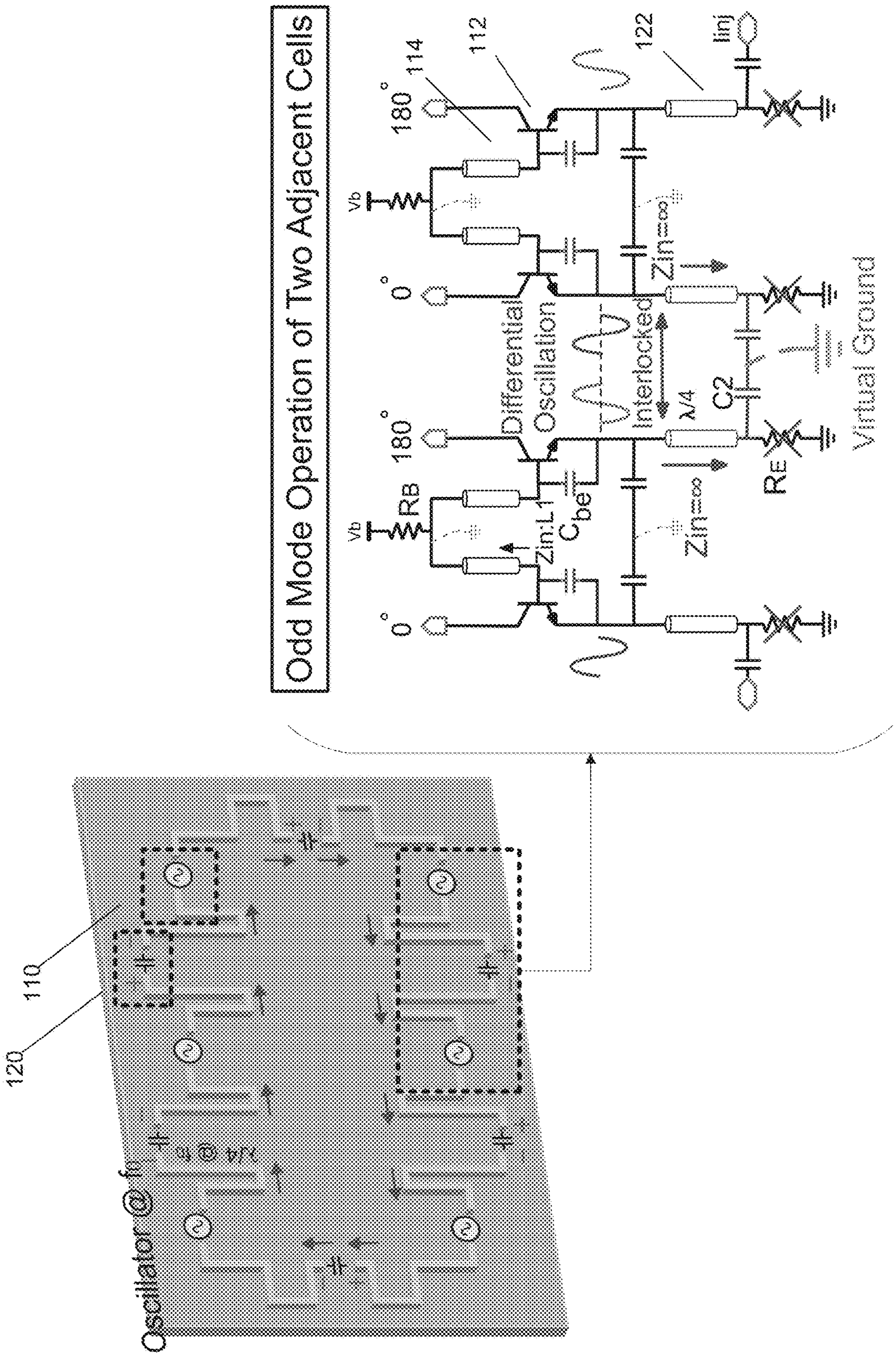
FIG. 1E illustrates an exploded view of the odd mode operation of two adjacent oscillator cores in accordance with an embodiment of the invention.

In several embodiments, each oscillator core 110 is locked to the adjacent oscillator core through a coupling network 120 of quarter-length T-lines 122 and capacitors C2 such that the cores operate collectively. This mutual coupling between the oscillator cores can reduce phase noise. A stable phase match between the oscillator cores can be important to achieve high directivity in an array. Similarly, impedance between the adjacent oscillator cores is low in even mode, which results in low charge accumulating across C1, and hence generates a low frequency that the oscillator cannot oscillate on. However, in the odd mode operation of two adjacent oscillator cores as illustrated in FIG. 1E in accordance with an embodiment of the invention, the impedance is large and oscillation can be sustained. By choosing an appropriate length of T-line connecting the two adjacent cores, phases may be adjusted such that the frequency generated by the capacitors do not cancel each other out, and radiation power at the $5^{th}$ harmonic can be maximized.

Figure 1F:
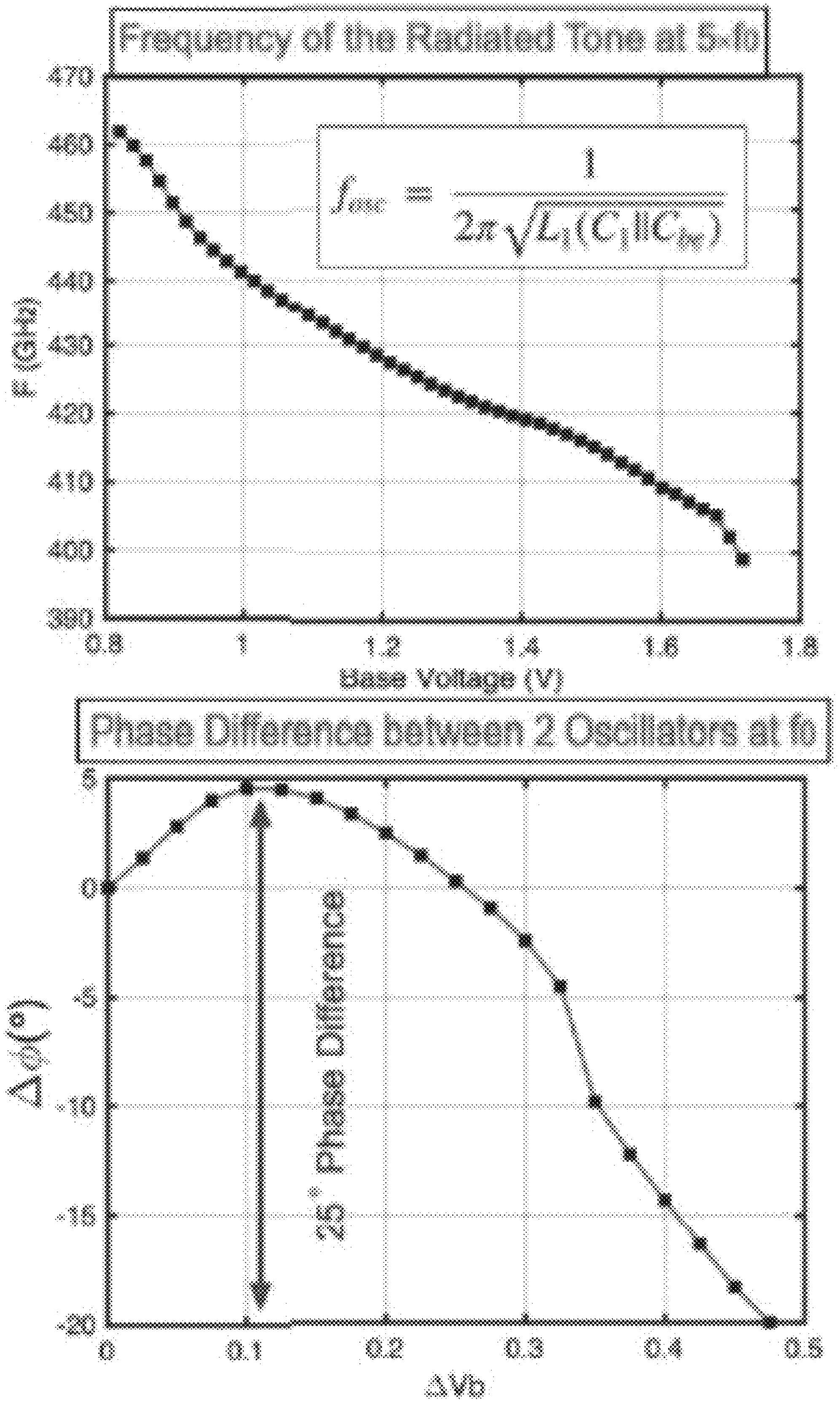
FIG. 1F illustrates the tuning range and phase shift between two adjacent oscillator cores in accordance with an embodiment of the invention.

Odd or differential mode coupling allows for wide tuning range and stable phase matching between adjacent cores. The top graph in FIG. 1F illustrates a plot of base voltage vs. generated frequency for a circuit such as one described above with respect to FIGS. 1A-1E. The graph shows a tuning range of 14.6%, where the radiating tone ($5^{th}$ harmonic) can be tuned from 399 to 462 GHz. The oscillators remain locked even when $V_b$ of the transistors are different. As shown in the bottom graph in FIG. 1F, a phase shift occurs between two adjacent oscillator cores when the base voltages of the adjacent cores are different ($\Delta V_b$), which can be used for beam steering. Furthermore, this architecture can be scaled up by adding additional mutually coupled oscillator cores to implement a large array.

Although FIGS. 1A-1E illustrate a particular circuit architecture of a THz radiating array, any of a variety of circuit architectures can be utilized as appropriate to the requirements of a specific application in accordance with embodiments of the invention. As will be discussed in greater detail below, in several embodiments the oscillator cores can each be connected to an antenna through a nonlinear stage. Radiating arrays of antennas and nonlinear stages that may be implemented in accordance with embodiments of the invention are described next.

Radiating Array Design

Figure 2A:
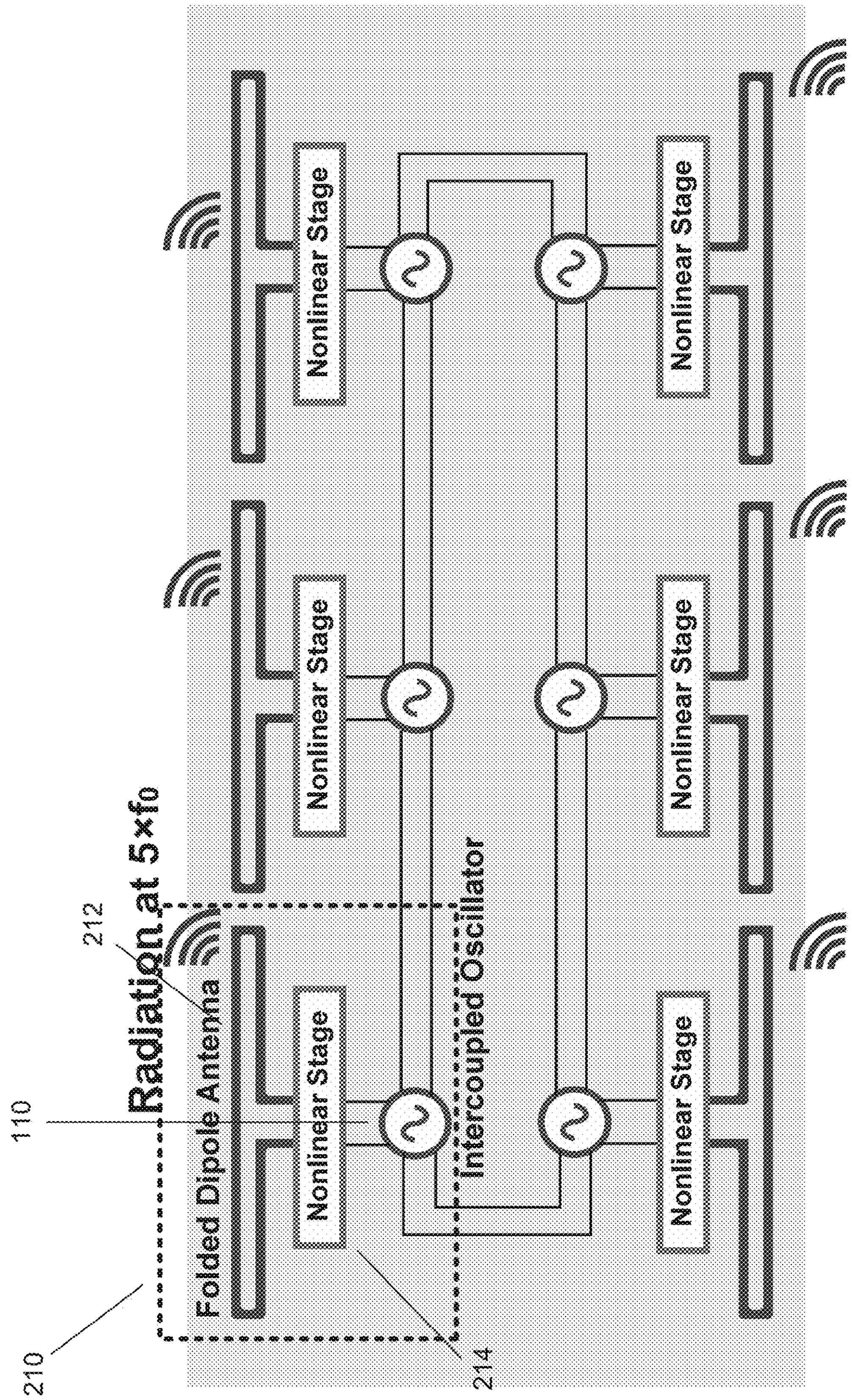
FIG. 2A illustrates an example schematic of a highly power efficient p-i-n diode-based THz radiating array in accordance with an embodiment of the invention.

A circuit architecture of a highly power efficient, p-i-n diode-based THz radiating array in accordance with embodiments of the invention is illustrated in FIG. 2A. The radiating array may include a number of radiating elements 210 corresponding to the number of oscillator cores 110. In numerous embodiments, radiating element 210 includes a folded dipole antenna 212 is coupled to the oscillator core 110, and can radiate a certain harmonic of the output generated by the nonlinear stage 214 based on the output of the oscillator core 110. In several embodiments, the radiating element 210 may include an on-chip antenna. In many embodiments, the nonlinear stage 214 includes a p-i-n diode 216 that is coupled to the oscillator core 110 to generate tones above $f_{max}$ of the transistor.

Figure 2B:
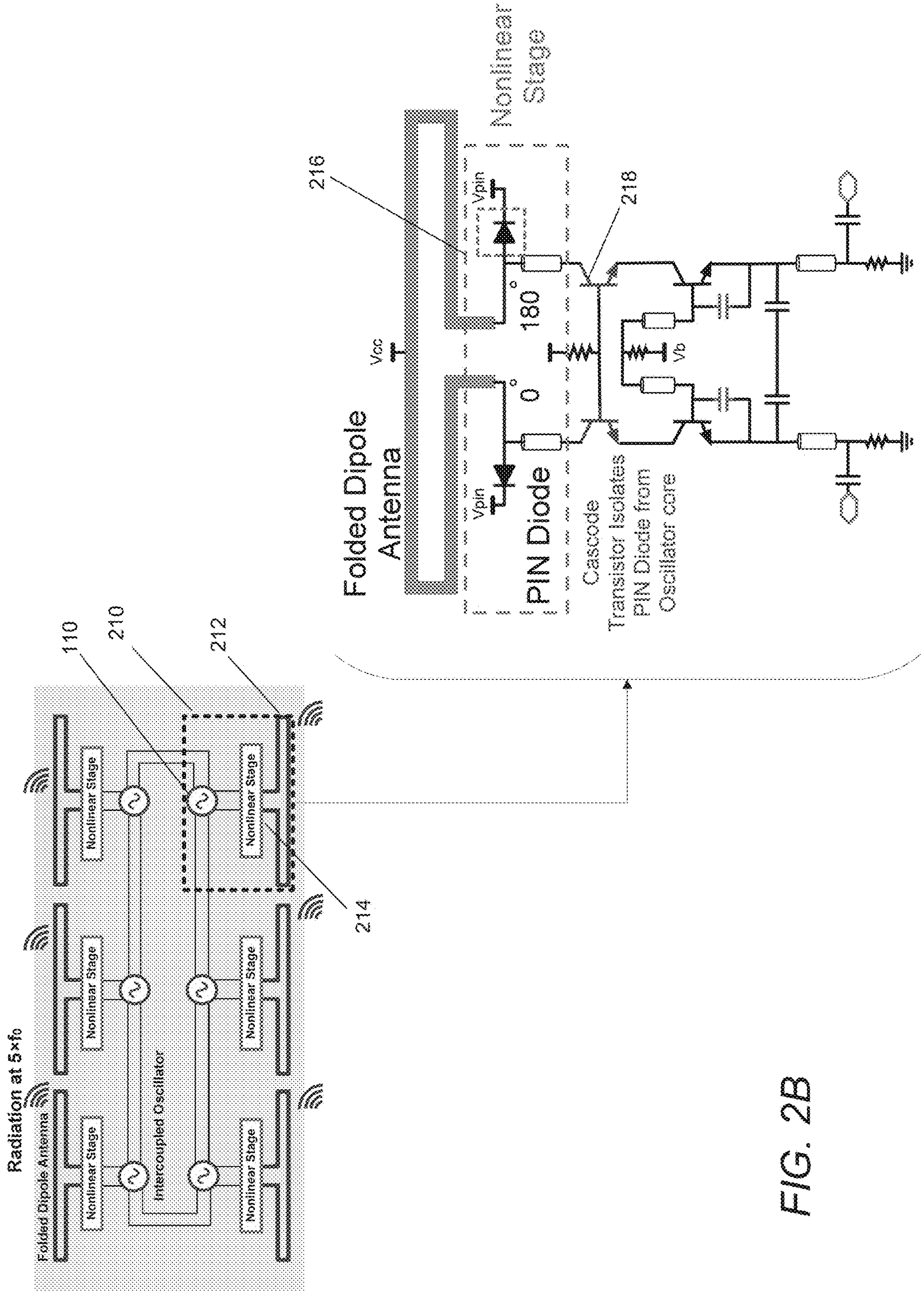
FIG. 2B illustrates an exploded view of the schematic of the nonlinear stage connecting the oscillator core to the folded dipole antenna in accordance with an embodiment of the invention.

An exploded view of the nonlinear stage 214 connecting the folded dipole antenna 212 to the oscillator core 110 is illustrated in FIG. 2B in accordance with an embodiment of the invention. In many embodiments, a cascode transistor 218 is used to drive the p-i-n diode 216 with the output of the oscillator, and provide some degree of isolation between the p-i-n diode 216 and the oscillator core 110. The cascode transistor 218 may prevent the disruption of the oscillator core 110, which can be caused by strong swings at the antenna input.

Figure 2C:
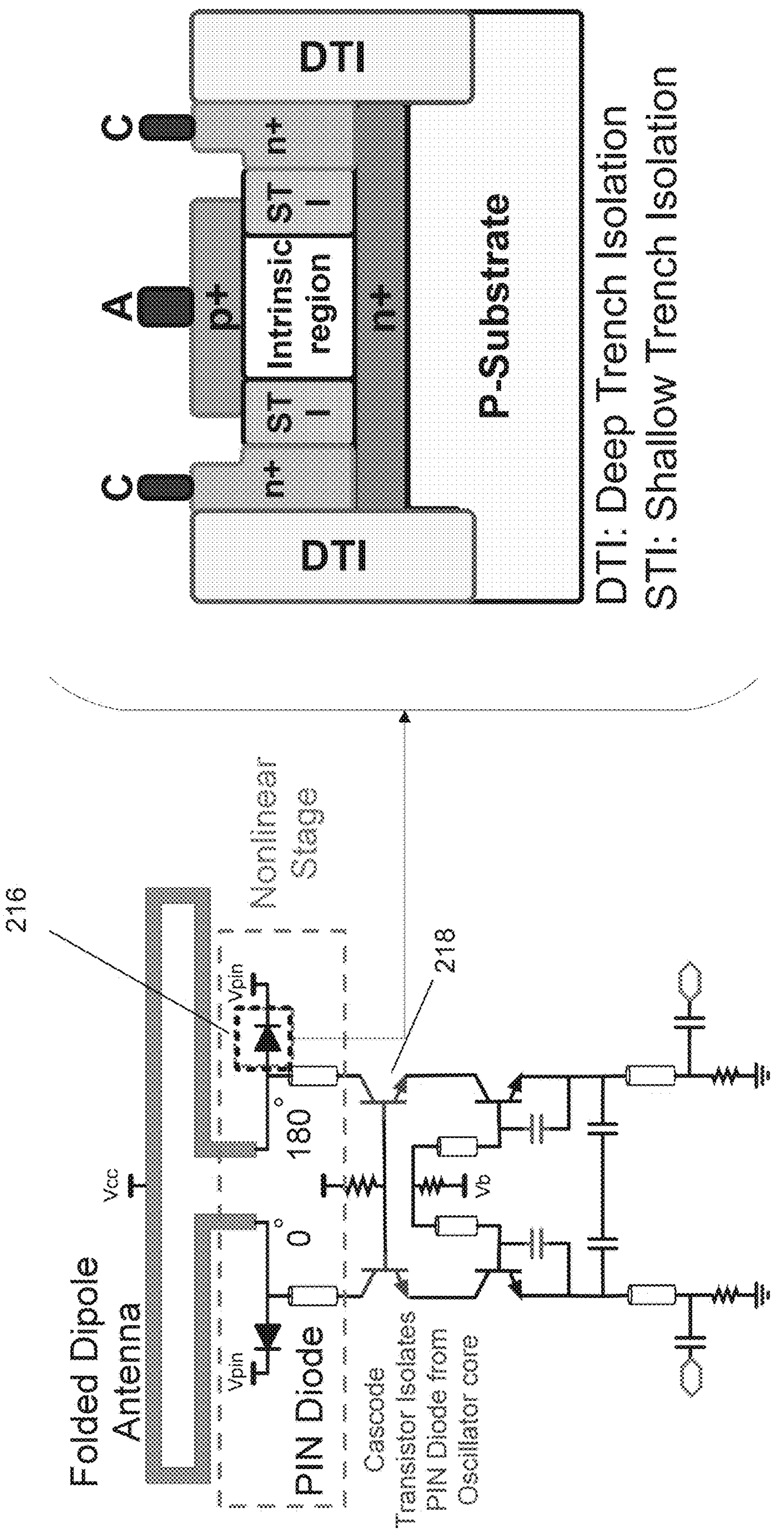
FIG. 2C illustrate an exploded view of the p-i-n diode in accordance with an embodiment of the invention.
Figure 3A:
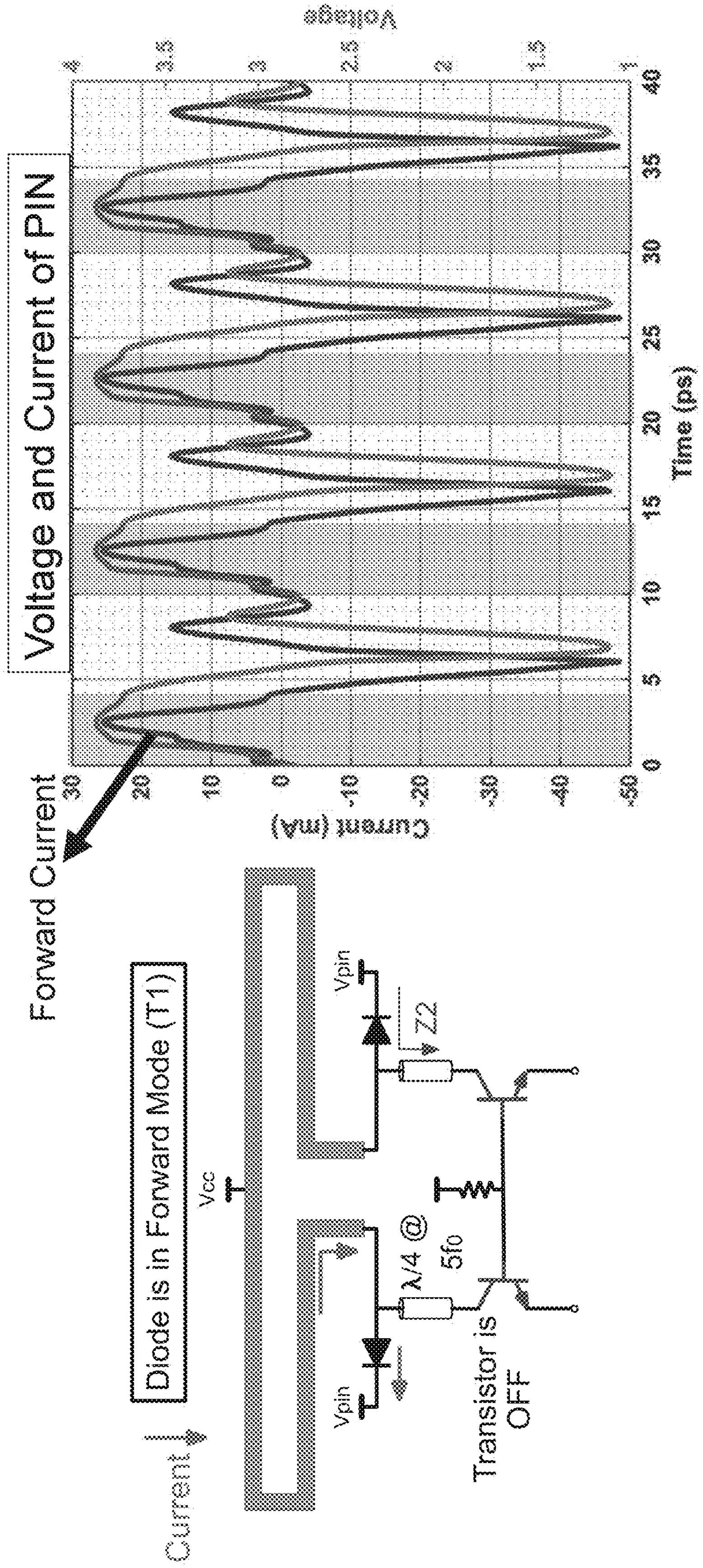
FIG. 3A-C illustrates the transient responses of the forward-reverse mode of operation of the p-i-n diode in accordance with an embodiment of the invention.
Figure 3B:
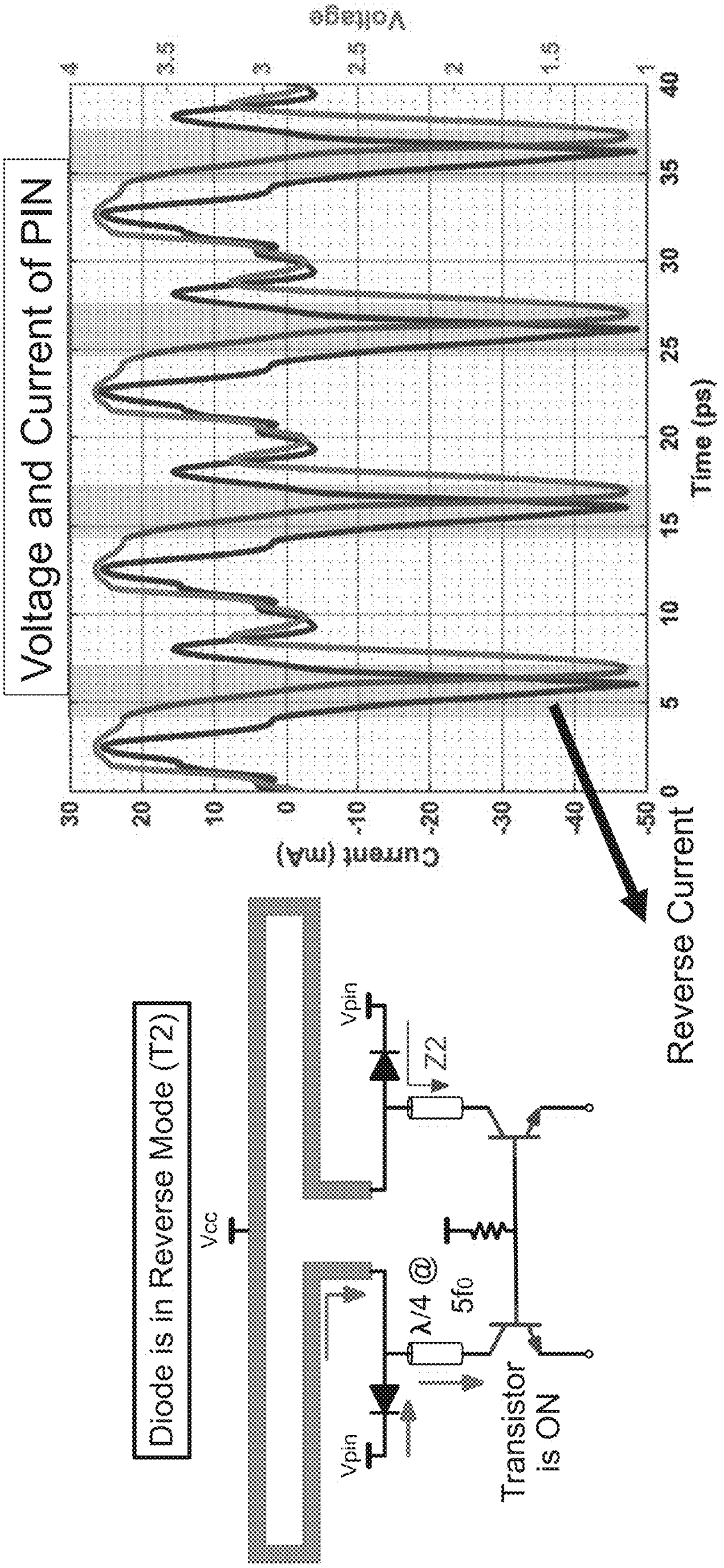
Figure 3C:
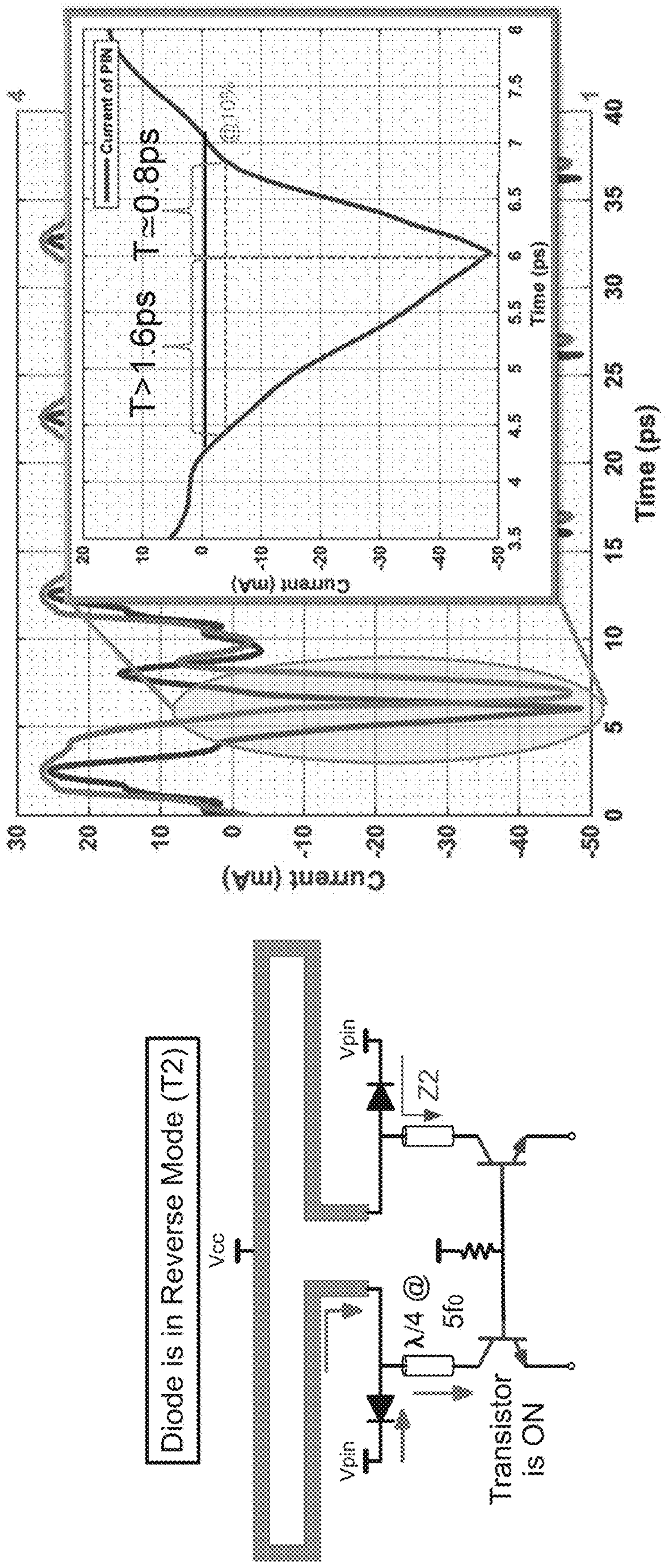

The p-i-n diode 216 as illustrated in FIG. 2C in accordance with an embodiment of the invention, includes intrinsic and p, n regions. The p-i-n diode 216 has very low parasitic resistance, and can function as an ultra-fast current switch in reverse recovery, which can abruptly change the current of the antenna resulting in a high nonlinearity and strong harmonic generation. FIG. 3A-C illustrates the operation of the p-i-n diode 216 in forward-reverse mode in accordance with an embodiment of the invention. In forward mode illustrated by FIG. 3A, cascode transistors are switched off. Due to the inductance of the folded dipole antenna, current flows in the direction of the diode as demonstrated by the increase in positive current where some charges are accumulated on the diode. The accumulated charges do not dissipate instantly, and can persist during the diode's reverse mode operation. As the cascode transistors switch on in FIG. 3B, current switches directions from forward to reverse, voltage changes quickly from $V_f$ to $V_{reverse}$ as well. Every time the direction of current switches, charges accumulate and dissipates, $V_f$ is changed to $V_{reverse}$ like a switch. In many embodiments, higher order harmonics of the fundamental frequency are generated due to the quick switches. As illustrated in FIG. 3C, the reverse switch is able to generate approximately 50 mA in 0.8 ps, which leads to high nonlinearity that may be used to generate THz harmonics. Such a large change in current occurring in less than 2.4 ps cannot be performed by CMOS and bipolar transistors, and gives p-i-n diodes their unique advantage.

Figure 4A:
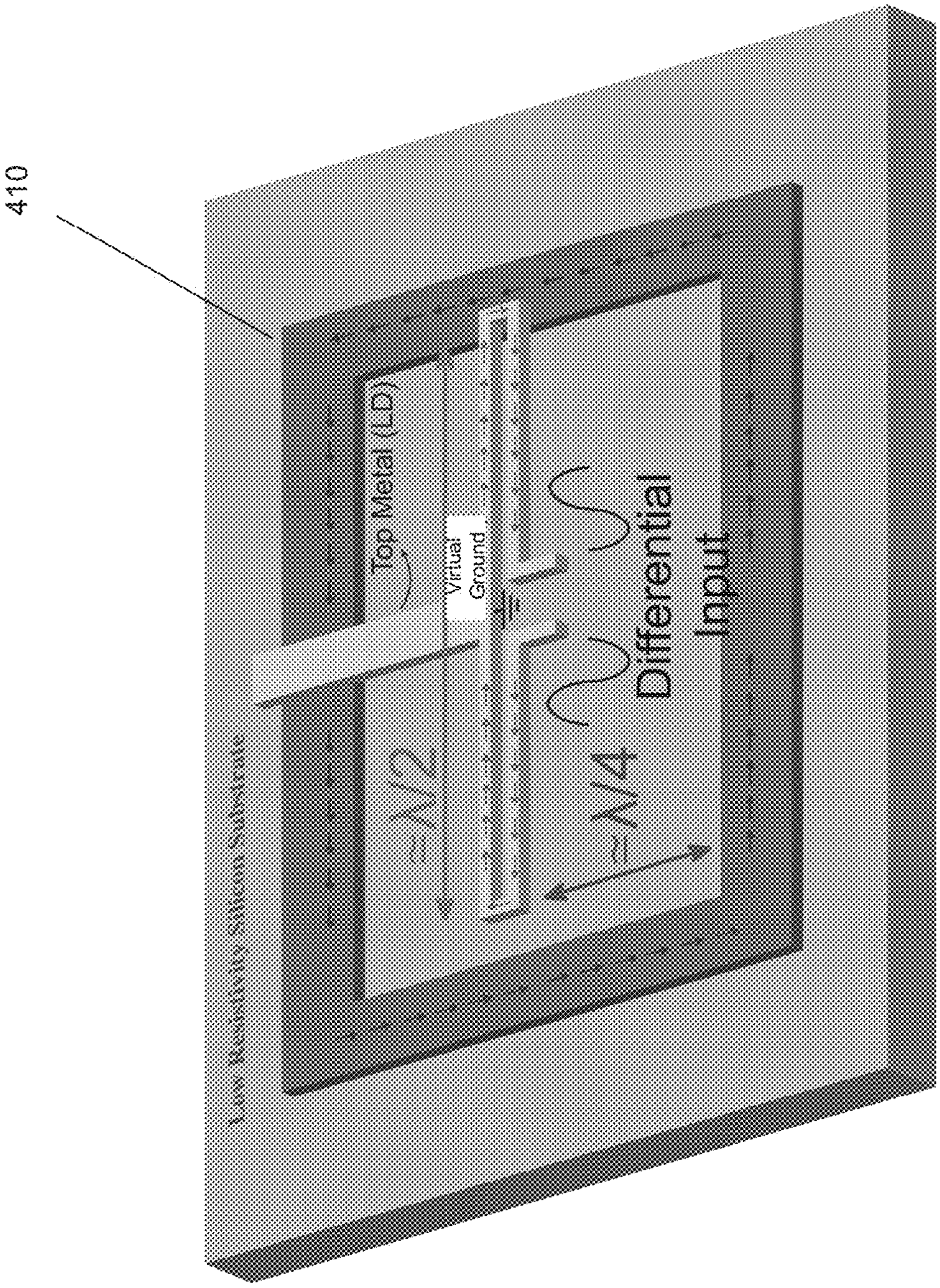
FIG. 4A illustrates an example optimized antenna design in accordance with an embodiment of the invention.

For efficient THz harmonic generation, the antenna impedance is optimized in many embodiments of the invention. To calculate the optimum impedance of the antenna, an RLC model of the antenna at the 5th harmonic (420 GHz) is derived and used. An optimized antenna design that provides a proper impedance matching without requiring an additional matching network in accordance with an embodiment of the invention is illustrated in FIG. 4A. The antenna length is approximately half of the wavelength (~λ/2) at 425 GHz for optimum radiation at the 5th harmonic of the fundamental frequency of the oscillator core. To improve the efficiency of the folded dipole antenna, a proper return path may be utilized.

Figure 4B:
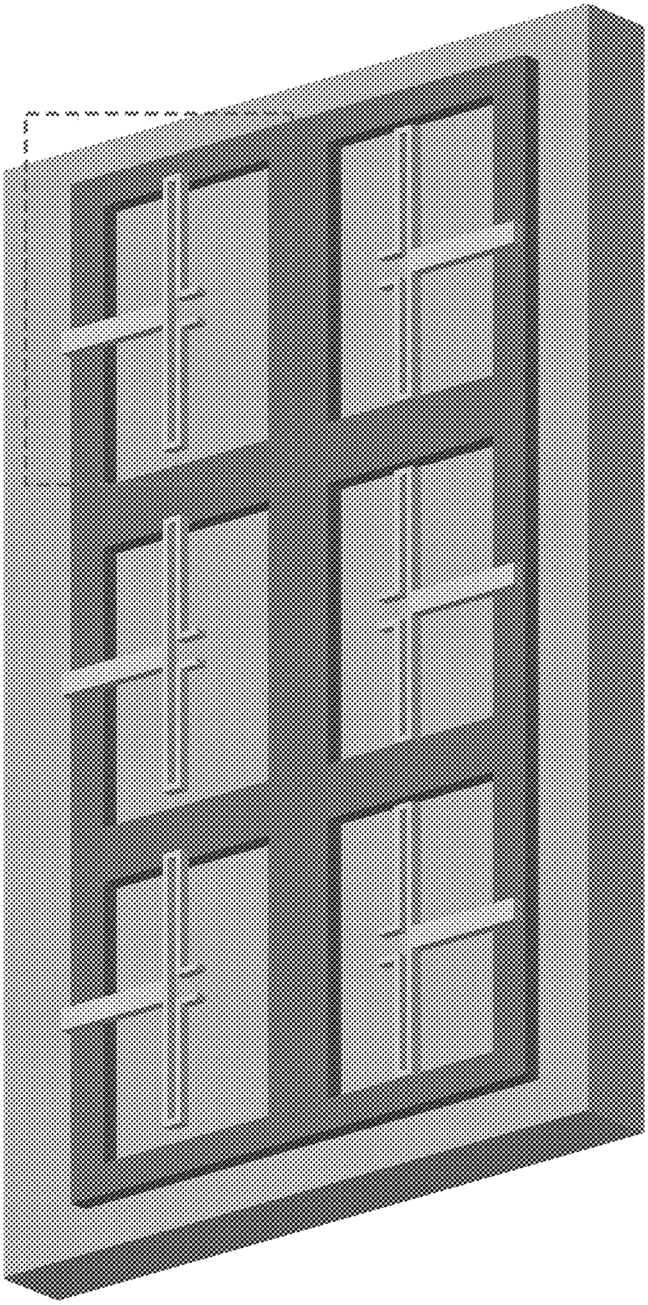
FIG. 4B illustrates an example arrangement of optimized antennas that would each be coupled to an oscillator core in accordance with an embodiment of the invention.
Figure 4C:
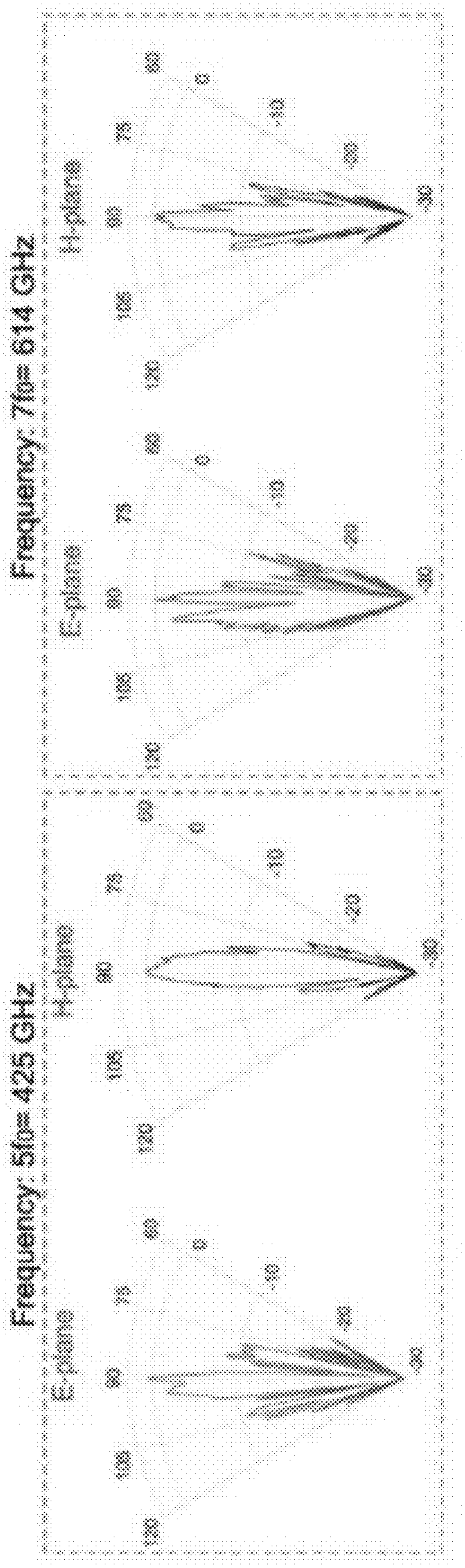
FIG. 4C illustrates the radiation efficiency of the antenna at the $5^{th}$ harmonic.

In many embodiments, providing a return path with a 90° phase difference can prevent current being returned to the lossy substrate due the direct coupling of the antenna. Therefore, a metal ring 410 with a λ/4 spacing from the antenna may be used as the return path, resulting in an improvement in the radiation efficiency and bandwidth. Antennas may be placed in other directions with respect to the metal ring 410. FIG. 4B illustrates a 2×3 arrangement of the optimized antennas that would each be coupled to an oscillator core (such as those described further above with respect to FIGS. 1A-1E) in accordance with embodiments of the invention. FIG. 4C illustrates the radiation efficiency of the antenna at the $5^{th}$ harmonic. Radiation efficiency ranges from 30 to 52% in the 400-to-460 GHz range using hemispherical silicon lens. Radiation pattern is measured by using a step motor with half-degree precision, and the results are shown at 424.77 and 614.3 GHZ. The estimated directivity at these frequencies is 23 and 27 dBi. Although particular architectures of intercouple oscillators and radiating arrays are discussed above, one skilled in the art will recognize that a number of architectures may be implemented in accordance with embodiments of the invention as appropriate to any specific application.

Measurements

Figure 5:
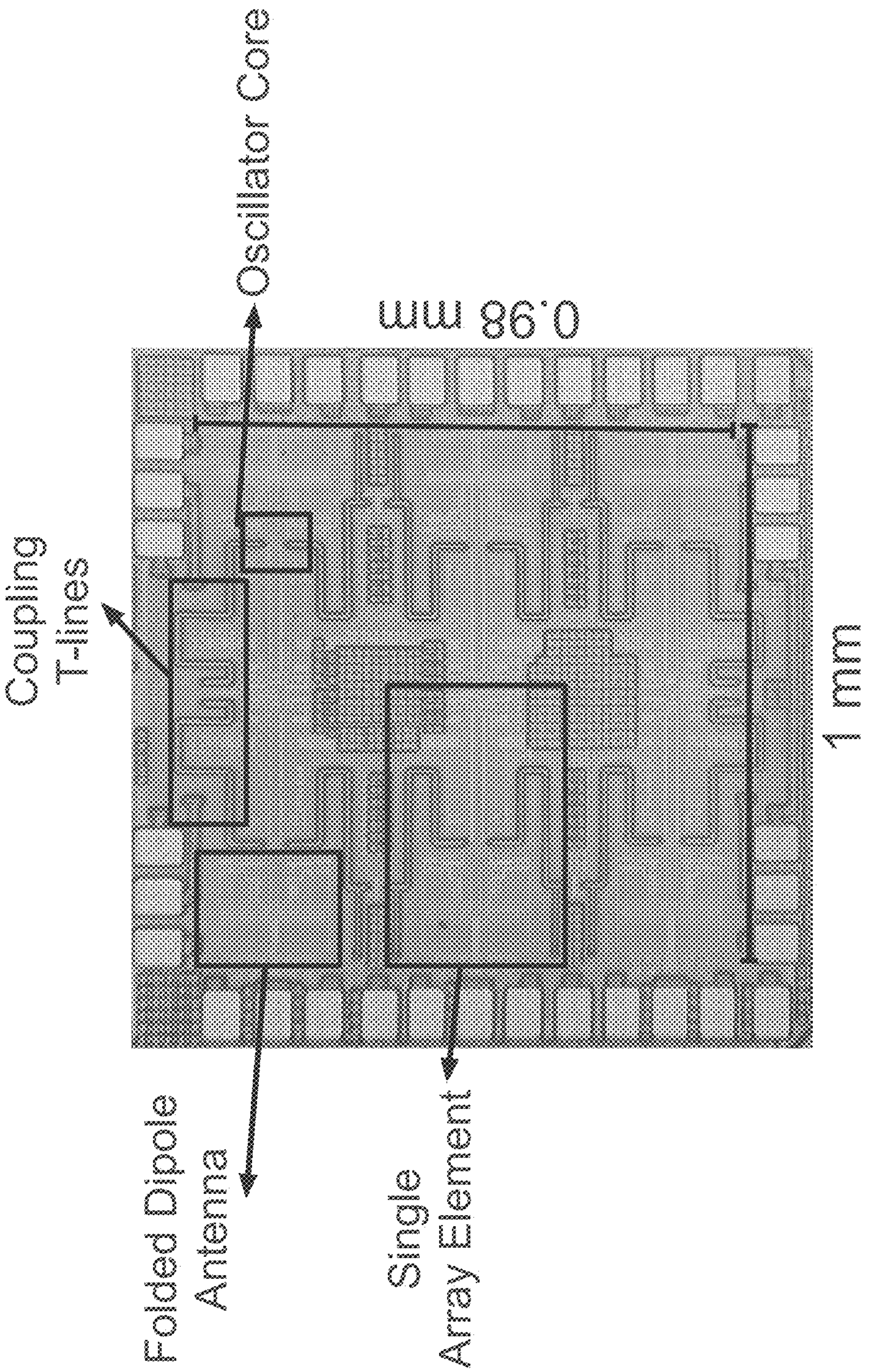
FIG. 5 illustrates a micro-graph of a die in accordance with an embodiment of the invention.
Figure 6:
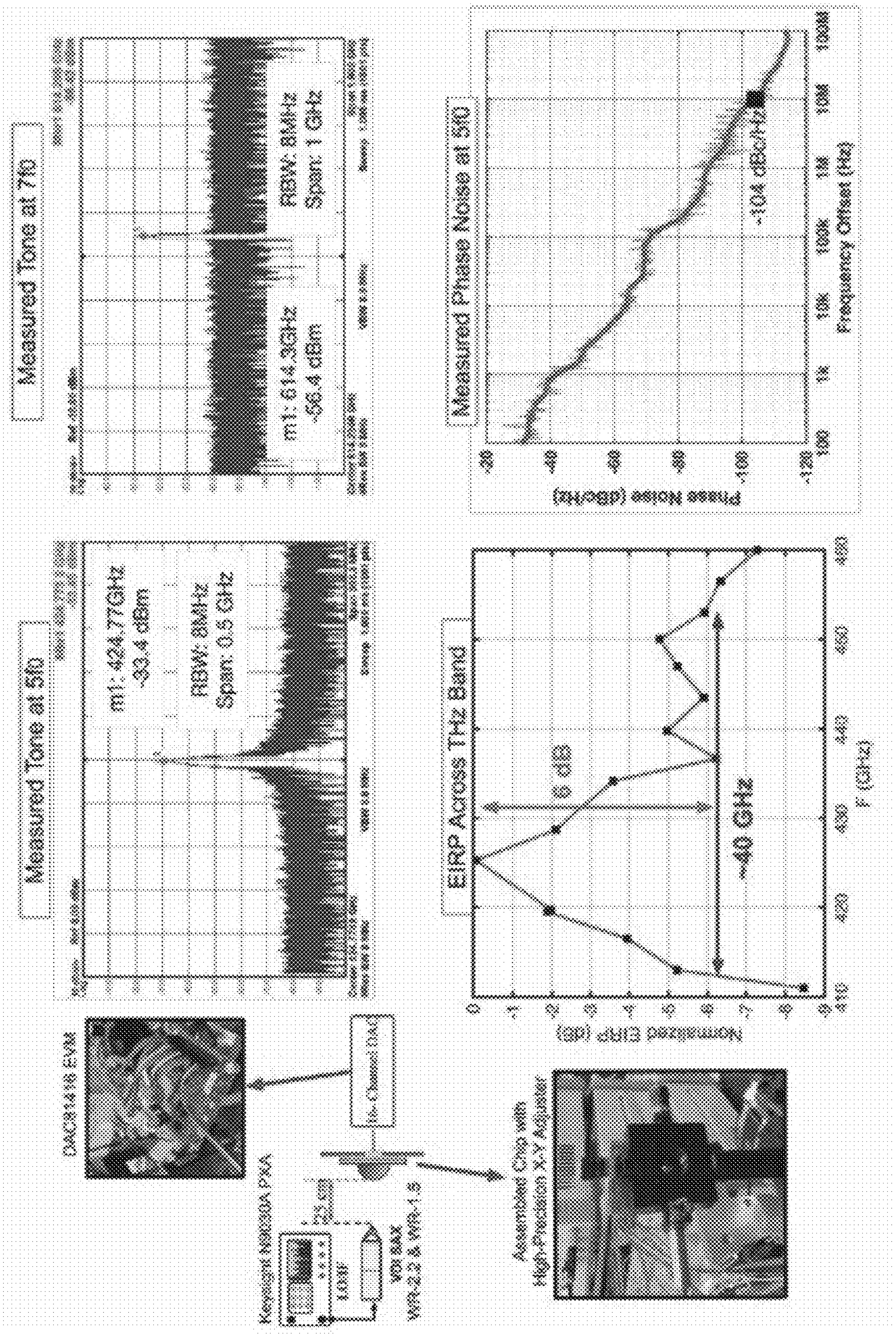
FIG. 6 illustrates the measurement setup for frequency-domain characterization in accordance with an embodiment of the invention.

A micro-graph of a die in accordance with an embodiment of the invention is shown in FIG. 5. In many embodiments, the design can be fabricated in a GlobalFoundries 90 nm SiGe BiCMOS 9HP process with a total area of 0.98 $mm^2$ (excluding pads). The power consumption of the chip is 400 mW. The measurement setup for frequency-domain characterization is illustrated in FIG. 6 in accordance with an embodiment of the invention. The received tones at 424.77 and 614.3 GHZ are −33.4 and −56.4 dBm, which correspond to the EIRP of 18.1 and 1.4 dBm respectively, taking into account of the polarization loss factor, VDI SAX conversion loss, and cable loss. VDI SAX is calibrated using a PM5 power meter and a VDI WR2.2 source. Additionally, EIRP fluctuates less than 6 dB over the ~40 GHz bandwidth. Note that the oscillation is sustained over more than a ~60 GHz frequency-tuning range. The measured phase noise of the radiated tone at 424.77 GHz is −104 dBc/Hz at a 10 MHz offset frequency in the free-running mode. Although the antenna is optimized for the 5th harmonic radiation, significant radiation is observed at higher odd harmonics as illustrated in FIG. 6.

Figure 7A:
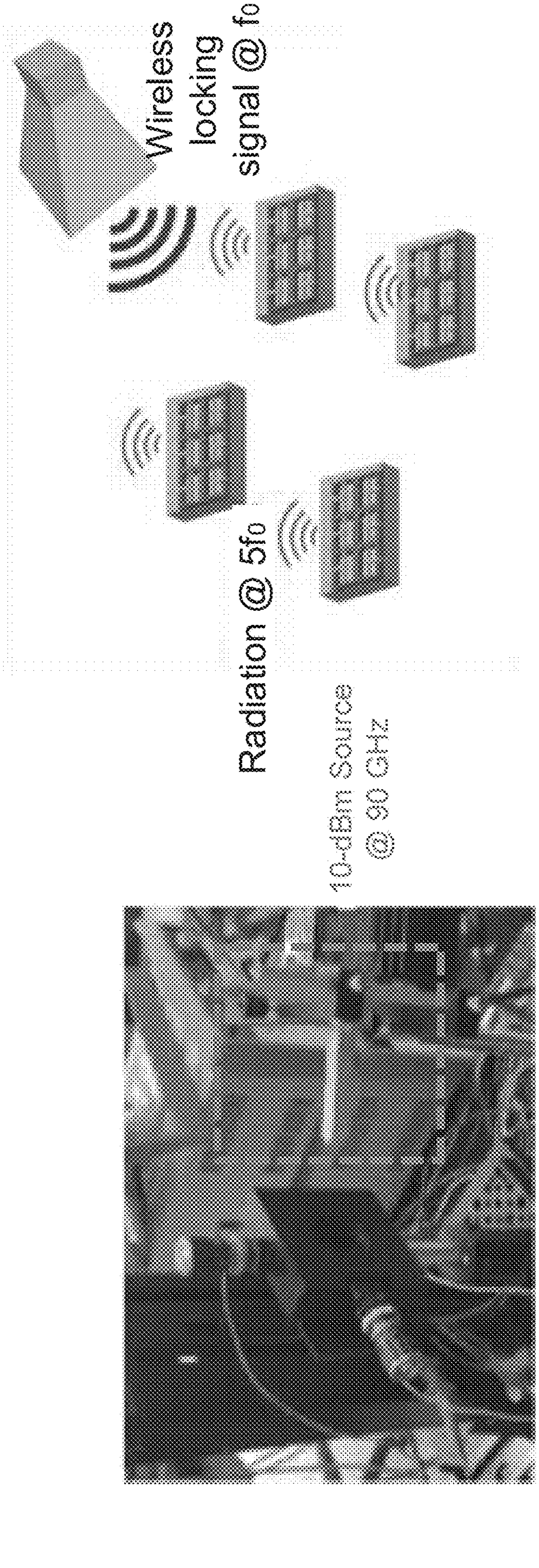
FIG. 7A illustrates a formation of a loop antenna by T-lines and demonstration of wireless locking using an external source in accordance with an embodiment of the invention.
Figure 7B:
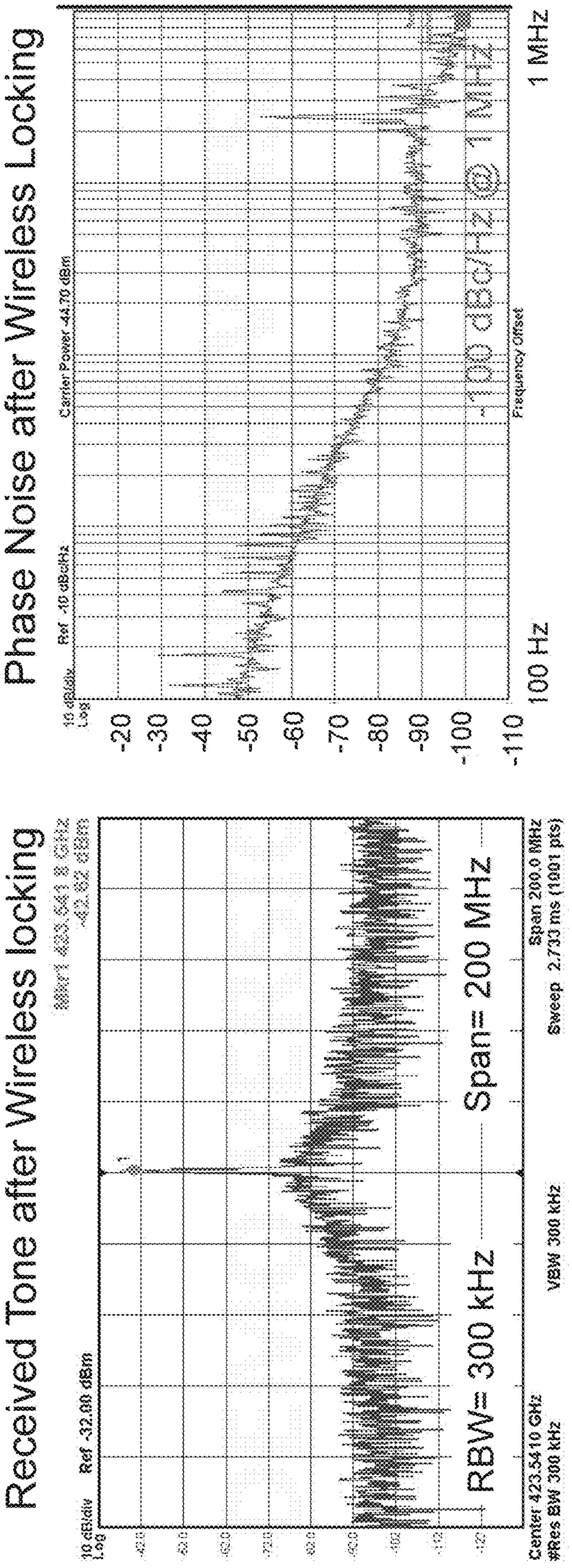
FIG. 7B illustrates the received tone and phase noise of the wirelessly locked loop antenna in accordance with an embodiment of the invention.

FIGS. 7A-7B illustrate formation of a loop antenna by T-lines and demonstration of wireless locking using an external source at the fundamental frequency in accordance with an embodiment of the invention. As shown in FIG. 7A, the T-line network, which connects the oscillators to each other can form a loop antenna at f0 enabling synchronization by a wireless external source. Individual oscillators may oscillate at own frequency and cancel each other out. Hence, they are coupled through highly optimized T-lines such that they oscillate at the same frequency with locked phases. To demonstrate this feature, an external source at ~88 GHz with 10 dBm radiated power can be used. FIG. 7B shows the spectrum and phase noise after locking by an external source. In this case the locking range is ~200 MHz using 10-dBm source with 25 dBi antenna gain at 20-cm distance from the top side of the chip. Although FIG. 7A-7B illustrate a particular formation of a loop antenna by T-lines, any of a variety of formations can be utilized as appropriate to the requirements of a specific application in accordance with an embodiment of the invention.

FIG. 8 illustrates a comparison between silicon-based THz sources. Many embodiments of the system provide one of the highest EIRP while benefiting from smaller array size, less power consumption, and less chip area. In addition, in many embodiments, using interlocked oscillator can allow scaling up the design and significantly improve the phase noise performance. In many embodiments, with the phase noise of −104 dBc/Hz at 10 MHz offset, report one of the lowest numbers compared to other works with free running oscillators. Furthermore, in many embodiments, due to employed architecture of the interlocked oscillators, the chip with more than 14% frequency tuning range, achieves one of the highest numbers amongst previous works and can cover more than 60 GHz in THz band.

Although specific methods of fabricating a highly power efficient p-i-n diode-based THz radiating array are discussed above, many different fabrication methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A p-i-n diode-based intercoupled THz radiating array, comprising:

a plurality of radiating array elements, wherein each of the plurality of array elements comprises an oscillator core configured to oscillate at a fundamental frequency, wherein the oscillator core of each array element is locked to an adjacent oscillator core through a coupling network comprising T-lines; and a p-i-n diode coupled to the oscillator core of each of the plurality of array elements and configured to produce harmonics of the fundamental frequency from an output signal from the oscillator core, wherein a cascode transistor drives the p-i-n diode with the output signal of the oscillator, wherein the cascode transistor provides isolation between the p-i-n diode and the oscillator core.

2. The THz radiating array of claim 1, further comprising an antenna coupled to the p-i-n diode and radiating at least one harmonic of the fundamental frequency.

3. The antenna of claim 2, wherein the antenna is tuned to maximize power radiated at a certain harmonic of the fundamental frequency.

4. The oscillator core of claim 1, where the oscillator core comprises a pair of oscillators.

5. The oscillator of claim 4, wherein the oscillator is a Colpitts oscillator that provides differential oscillation.

6. The THz radiating array of claim 1, wherein a biasing current of an oscillator is set by adjusting $V_{be}$ that determines an oscillation frequency through changing transistor base-emitter capacitance, wherein the THz radiating array further comprises an emitter comprising a resistor in conjunction with a quarter-length T-line.

7. The antenna of claim 2, wherein the antenna is a folded dipole antenna.

8. The antenna of claim 2, wherein the antenna is an on-chip antenna.

9. The THz radiating array of claim 1, wherein a T-line network that connects the oscillators to each other forms a loop antenna at the fundamental frequency enabling synchronization by an external source.

10. A method for wirelessly transmitting harmonics of a target frequency using a THz radiating array, the method comprising:

providing a radiating array with an input waveform, the radiating array comprising:

a plurality of radiating array elements, wherein each of the plurality of array elements comprises an oscillator core configured to oscillate at a fundamental frequency, wherein the oscillator core of each array element is locked to an adjacent oscillator core through a coupling network comprising T-lines; and a p-i-n diode coupled to the oscillator core of each of the plurality of array elements and configured to produce harmonics of the fundamental frequency from an output signal from the oscillator core, wherein a cascode transistor drives the p-i-n diode with the output signal of the oscillator, wherein the cascode transistor provides isolation between the p-i-n diode and the oscillator core;

tuning the input waveform to the fundamental frequency of the oscillator cores;

coupling the plurality of oscillator cores by matching the phases of the oscillator cores; and generating an output waveform at a harmonic of the input waveform using the p-i-n diodes.

11. The method of claim 10, further comprising radiating the output waveform using an antenna.

12. The method of claim 11, wherein the antenna is coupled to the p-i-n diode and radiating at least one harmonic of the fundamental frequency.

13. The method of claim 11, wherein the antenna is tuned to maximize power radiated at a certain harmonic of the fundamental frequency.

14. The method of claim 10, wherein the oscillator core comprises a pair of oscillators.

15. The method of claim 10, wherein the oscillator is a Colpitts oscillator that provides differential oscillation.

16. The method of claim 10, wherein a biasing current of an oscillator is set by adjusting $V_{be}$ that determines an oscillation frequency through changing transistor base-emitter capacitance, wherein the THz radiating array further comprises an emitter comprising a resistor in conjunction with a quarter-length T-line.

17. The method of claim 11, wherein the antenna is a folded dipole antenna.

18. The method of claim 11, wherein the antenna is an on-chip antenna.

19. The method of claim 10, wherein a T-line network that connects the oscillators to each other forms a loop antenna at the fundamental frequency enabling synchronization by an external source.

* * * * *